(12) United States Patent
Venugopal et al.

(10) Patent No.: US 12,445,175 B2
(45) Date of Patent: Oct. 14, 2025

(54) QUASI CO-LOCATION PARAMETER WEIGHTING FOR COHERENT JOINT TRANSMISSIONS

(71) Applicant: QUALCOMM Incorporated, San Diego, CA (US)

(72) Inventors: Kiran Venugopal, Green Brook, NJ (US); Wooseok Nam, San Diego, CA (US); Mostafa Khoshnevisan, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 17/984,799

(22) Filed: Nov. 10, 2022

(65) Prior Publication Data

US 2024/0162946 A1 May 16, 2024

(51) Int. Cl.
*H04B 7/0456* (2017.01)
*H04B 7/06* (2006.01)
*H04L 5/00* (2006.01)
*H04W 72/23* (2023.01)

(52) U.S. Cl.
CPC ......... *H04B 7/0456* (2013.01); *H04B 7/0615* (2013.01); *H04L 5/0053* (2013.01); *H04W 72/23* (2023.01)

(58) Field of Classification Search
CPC ... H04B 7/0456; H04B 7/0615; H04L 5/0053; H04W 72/23
See application file for complete search history.

(56) References Cited

U.S. PATENT DOCUMENTS

2023/0239103 A1\* 7/2023 Ji .............................. H04L 5/008
2025/0125926 A1\* 4/2025 Muruganathan .... H04W 72/231

\* cited by examiner

*Primary Examiner* — Brian P Cox
(74) *Attorney, Agent, or Firm* — Loza & Loza, LLP/Qualcomm

(57) ABSTRACT

Aspects relate to techniques for quasi co-location (QCL) parameter weighting for coherent joint transmissions (CJTs). A network entity can provide an indication of a respective weight to be applied to each of a plurality of transmission configuration indicator (TCI) states, each associated with a respective transmission and reception point (TRP) of the network entity for a CJT transmission. The network entity can use the respective weights to generate the CJT transmission and provide the CJT transmission to a user equipment (UE).

30 Claims, 22 Drawing Sheets

QUASI CO-LOCATION PARAMETER WEIGHTING FOR COHERENT JOINT TRANSMISSIONS

TECHNICAL FIELD

The technology discussed below relates generally to wireless communication networks, and more particularly, to indicating weights applied to quasi co-location (QCL) parameters for transmission configuration indicator (TCI) states of coherent joint transmissions (CJTs).

INTRODUCTION

In wireless communication systems, such as those specified under standards for 5G New Radio (NR), a network entity, via a plurality of transmission and reception points (TRPs), and user equipment (UE) may utilize beamforming for spatial division multiplexing, to improve the reliability of streams received by the UE from the plurality of TRPs. To facilitate beamformed communication, the network entity may provide the UE with a set of transmission configuration indicator (TCI) states.

TCI states may be activated or deactivated for a UE. The network entity may select from among the various TCI states to communicate downlink or uplink channels or downlink or uplink signals between the network entity and the UE via multiple transmission and reception points.

In single frequency networks (SFNs), multiple TRPs may serve a single UE and transmit on the same time-frequency resource. Because of densification, SFN may be used to provide spatial diversity gain, where adjacent TRPs transmit the same data in a same time-frequency resource to provide the UE with a signal (carrying the data) from multiple TRPs simultaneously. For example, in an SFN, one port (e.g., a demodulation reference signal (DMRS) port) may be associated with two TCI states, each associated with a respective TRP.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a network entity including a memory and a processor coupled to the memory is disclosed. The processor can be configured to provide an indication of a respective weight to be applied to each of a plurality of quasi co-location (QCL) parameters for each of a plurality of transmission configuration indicator (TCI) states associated with a single port, in which each of the plurality of TCI states is associated with a respective transmission and reception point (TRP) of a plurality of TRPs. The processor can be further configured to provide a coherent joint transmission (CJT) across the plurality of TRPs using the respective weights to a user equipment (UE).

Another example provides a user equipment (UE) including a transceiver, a memory, and a processor coupled to the transceiver and the memory. The processor can be configured to receive, from a network entity, an indication of a respective weight to be applied to each of a plurality of quasi co-location (QCL) parameters for each of a plurality of transmission configuration indicator (TCI) states associated with a single port, in which each of the plurality of TCI states is associated with a respective transmission and reception point (TRP) of a plurality of TRPs associated with the network entity. The processor can further be configured to receive a coherent joint transmission (CJT) transmitted across the plurality of TRPs and process the CJT using composite QCL parameters generated based on the respective weights.

Another example provides a method for wireless communication at a network entity. The method includes providing an indication of a respective weight to be applied to each of a plurality of quasi co-location (QCL) parameters for each of a plurality of transmission configuration indicator (TCI) states associated with a single port, in which each of the plurality of TCI states is associated with a respective transmission and reception point (TRP) of a plurality of TRPs. The method further includes providing a coherent joint transmission (CJT) across the plurality of TRPs using the respective weights to the UE.

Another example provides a method for wireless communication at a user equipment (UE). The method includes receiving, from a network entity, an indication of a respective weight to be applied to each of a plurality of quasi co-location (QCL) parameters for each of a plurality of transmission configuration indicator (TCI) states associated with a single port, in which each of the plurality of TCI states is associated with a respective transmission and reception point (TRP) of a plurality of TRPs associated with the network entity. The method further includes receiving a coherent joint transmission (CJT) transmitted across the plurality of TRPs and processing the CJT using composite QCL parameters generated based on the respective weights.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
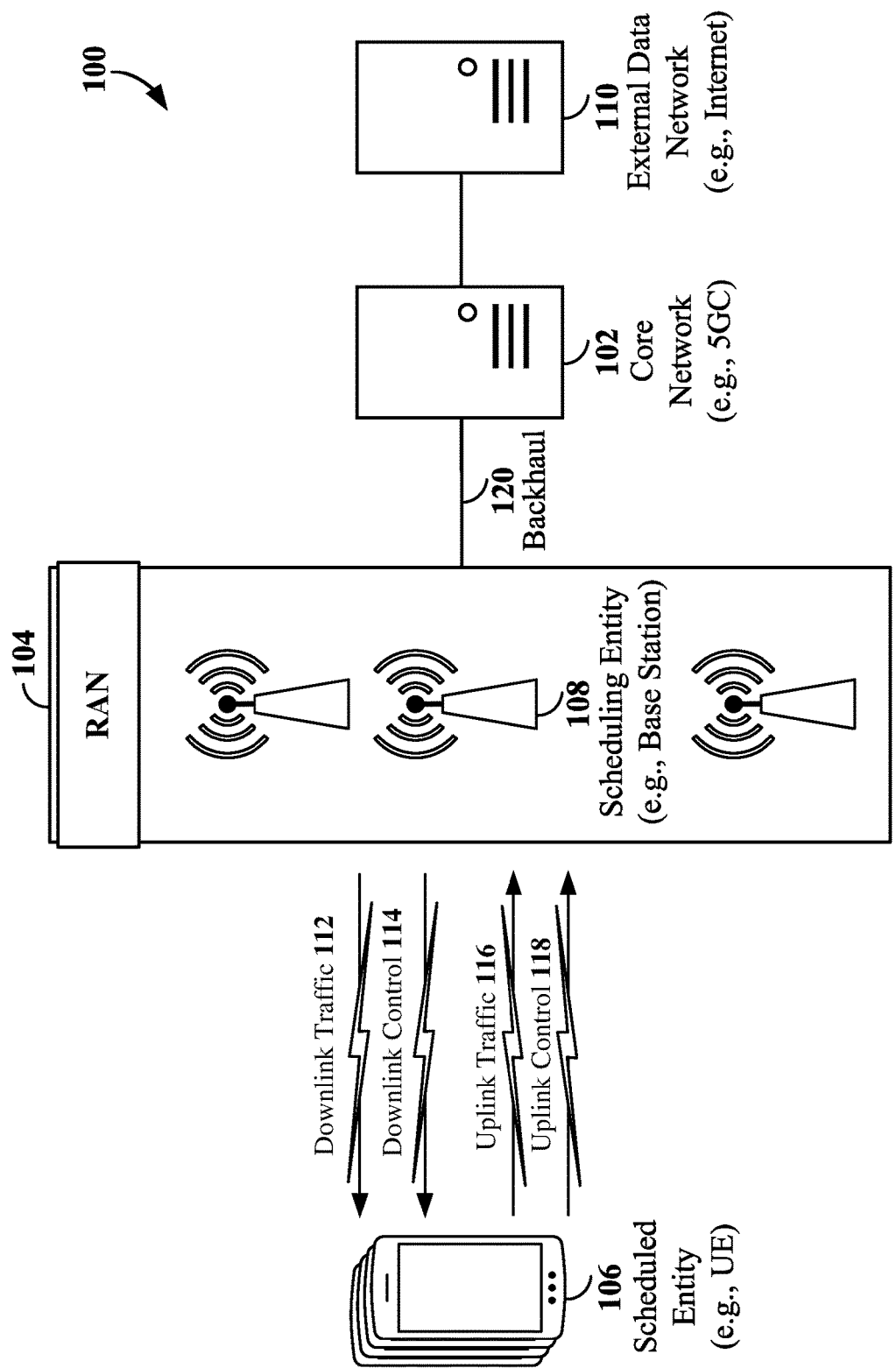
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

A network entity (e.g., an aggregated or disaggregated base station, such as gNode B (gNB)) may transmit a transmission configuration indication (TCI) state configuration message (e.g., via a radio resource control (RRC) message) to a UE including a plurality of TCI states configured for the UE. Each TCI state may include quasi co-location (QCL) information indicating one or more QCL parameters (e.g., time domain parameters, such as average delay and delay spread, Doppler parameters, such as Doppler shift and Doppler spread, and/or spatial domain parameters, such as beam direction and/or beam width). In addition, the QCL information may further indicate downlink reference signals from which various radio channel properties of downlink transmissions may be inferred. An example of QCL information includes QCL-TypeA, which indicates a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred.

Once the configured TCI states are provided to the UE, a network entity may activate or deactivate one or more of the configured TCI states for the UE by transmitting a TCI state activation message, such as a medium access control (MAC) control element (MAC-CE). The network entity may then select one of the activated TCI states to communicate a downlink transmission to the UE. For example, the network entity may indicate a particular TCI state for a downlink transmission within downlink control information (DCI) scheduling the downlink channel or signal.

In single frequency networks (SFNs), two transmission reception points (TRPs) of a network entity, which may be deployed, for example, in remote or co-located configuration, may serve a UE and transmit the same downlink transmission (e.g., downlink channel or downlink signal) to the UE on the same time-frequency resource. The network entity may configure each TRP with a different TCI state associated with that TRP to transmit the downlink transmission to the UE. In addition, the network entity may transmit a single MAC-CE to activate two different TCI states (e.g., each associated with a different TRP) for a SFN physical downlink shared channel (PDSCH) transmission. For example, the MAC-CE may include a TCI codepoint that that maps to two TCI states.

SFN transmissions may be considered as a subset of coherent joint transmissions (CJTs). CJTs may be transmitted across multiple (e.g., two or more) TRPs. For example, a PDSCH may be coherently and jointly transmitted from a plurality of TRPs of a network entity to a UE. In both CJT and SFN, one port (e.g., a DMRS port) can be associated with two (or more for CJTs) TCI states, each of which has quasi co-location (QCL) parameters associated therewith. The QCL parameters for the different TCI states may be combined to produce the joint (effective) channel over which the SFN/CJT is transmitted. For SFN, the QCL combination may be known or implicitly determined. However, for CJT, the weighting for combining the TCI states is not specified. Moreover, in certain cases, dynamic configuration of the weighting of the QCL parameters per TCI state for SFN transmissions may be desired.

Therefore, aspects relate to a network entity (e.g., an aggregated or disaggregated base station) selecting QCL combining weights to be applied to each of a plurality of QCL parameters for each of a plurality of TCI states for a CJT. An indication of the selected QCL combining weights may then be provided to the UE for correct demodulation and decoding of the CJT. The QCL parameters may include, for example, Doppler shift, Doppler spread, average delay, and delay spread. In some aspects, different weighting is used between the different QCL parameters. In other aspects, common weighting is used between the different QCL parameters. In some examples, the network entity may provide an explicit indication of a configured value (e.g., between zero and one) of a QCL combining weight applied to one of the TCI states. The UE may then derive the remaining weights applied to remaining TCI states by scaling the associated parameters. For example, the network entity may transmit downlink control information (DCI) including at least one codepoint mapped to at least one of the respective weights. In other examples, the network entity may transmit a medium access control (MAC) control element (MAC-CE) including a TCI codepoint activating the plurality of TCI states and further including the indication of the respective weights. In still other examples, the network entity may transmit a separate MAC-CE including the indication of the respective weights.

In some examples, a mapping between a plurality of amplitude coefficients of a Type II codebook and a plurality of weights may be defined. In this example, the network entity and the UE may use the mapping to determine the weights. In some examples, the weights may be determined based on a previous channel state information (CSI) report provided by the UE to the network entity that includes a precoding matrix indicator (PMI) indicating selected amplitude coefficients. In other examples, the weights may be determined based on other amplitude coefficients (e.g., different than the selected amplitude coefficients provided by the UE). In some examples, a new bit field may be configured in DCI scheduling a CJT that indicates whether the respective weights used for the CJT are based on the selected amplitude coefficients or other amplitude coefficients. In examples in which the bit field has a value set to indicate that the weights used for the CJT are associated with other amplitude coefficients based on the mapping, the DCI may further include an indication of the other amplitude coefficients.

In some examples, a TCI state may be configured via RRC as a linear combination of more than two source (basis) reference signals (RSs). Such an RRC configuration of TCI states may be considered as an enhanced TCI state configuration. With the enhanced TCI state configuration, during TCI state activation or TCI indication via DCI, the network entity may adjust the linear combining weights.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108, which may correspond, for example, to aggregated and/or disaggregated base stations. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion (e.g., via sidelinks) and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity (e.g., a UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
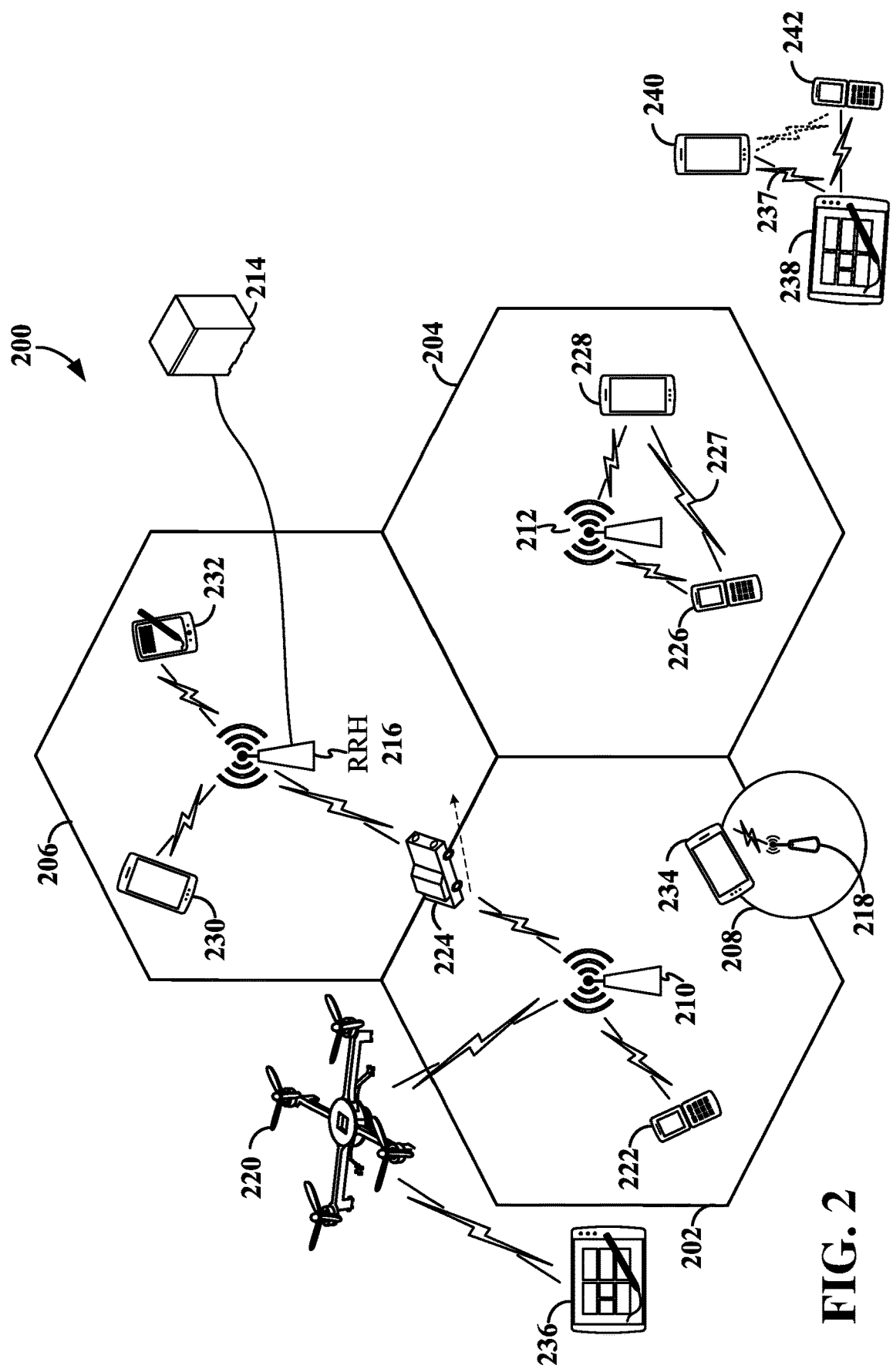
FIG. 2 is a diagram illustrating an example of a radio access network (RAN) according to some aspects.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station (e.g., aggregated or disaggregated). FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various network entity (e.g., base station) arrangements can be utilized. For example, in FIG. 2, two base stations, base station 210 and base station 212 are shown in cells 202 and 204. A third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an orthogonal frequency division multiplexing (OFDM) waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
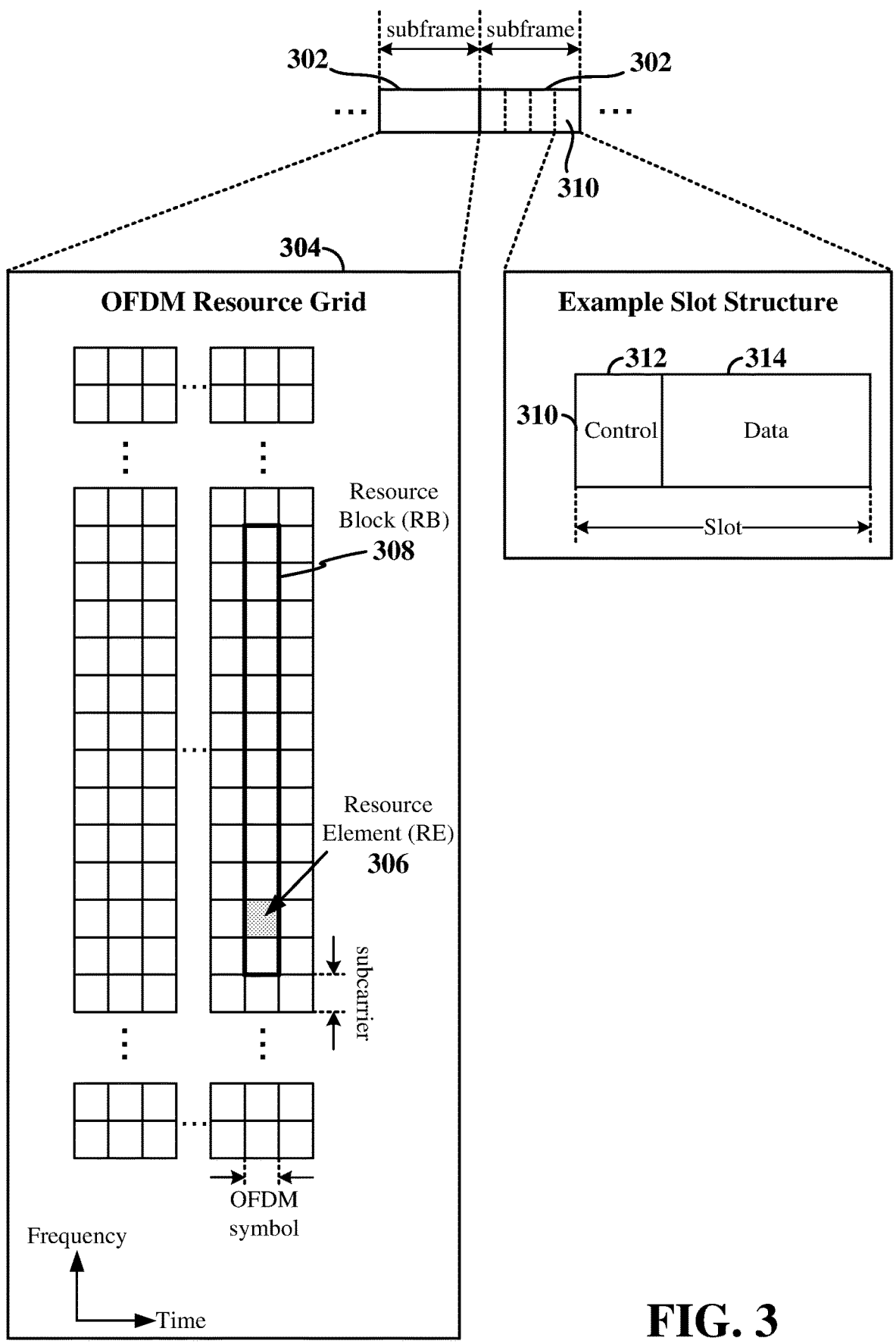
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
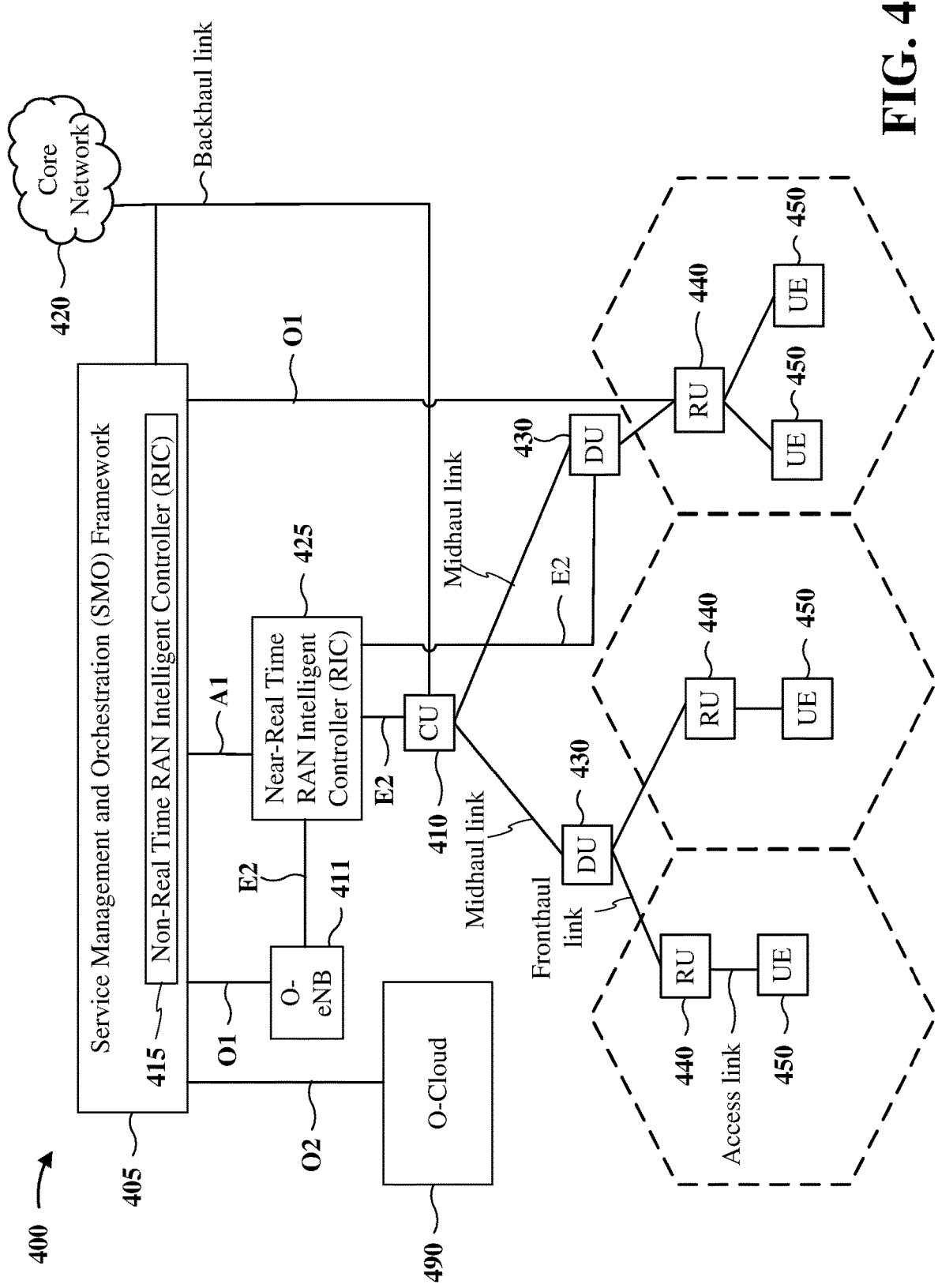
FIG. 4 is a diagram providing a high-level illustration of one example of a configuration of a disaggregated base station according to some aspects.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 450 via one or more radio frequency (RF) access links. In some implementations, the UE 450 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 450. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
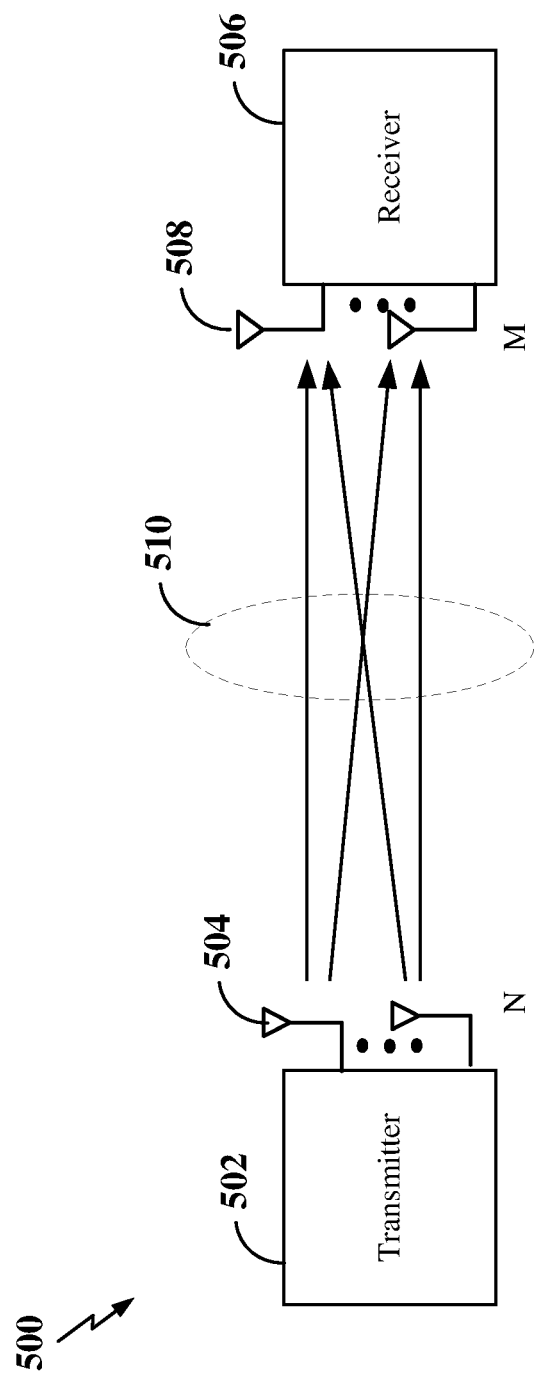
FIG. 5 is a diagram illustrating an example of a wireless communication system supporting beamforming and/or multiple-input multiple-output (MIMO) according to some aspects.

In some aspects of the disclosure, the scheduling entity (e.g., base station) and/or scheduled entity (e.g., UE) may be configured for beamforming and/or multiple-input multiple-output (MIMO) technology. FIG. 5 is a diagram illustrating an example of a wireless communication system 500 supporting beamforming and/or multiple-input multiple-output (MIMO) according to some aspects. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. The multiple transmit antennas 504 and multiple receive antennas 508 may each be configured in a single panel or multi-panel antenna array. Each of the transmitter 502 and the receiver 506 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 500 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 500 supporting MIMO) is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 5, a rank-2 spatial multiplexing transmission on a 2×2 MIMO antenna configuration will transmit one data stream from each of the transmit antennas 504. Each data stream reaches each of the receive antennas 508 along a different one of the signal paths 510. The receiver 506 may then reconstruct the data streams using the received signals from each of the receive antennas 508.

Based on the assigned rank, the network entity may then transmit channel state information reference signals (CSI-RSs) with separate C-RS sequences for each layer to provide for multi-layer channel estimation. From the CSI-RSs, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions. The RI and CQI may be transmitted, for example, within a channel state information (CSI) report. The CSI report may further include a precoding matrix indicator (PMI) that indicates to the base station the precoding matrix to use for transmissions to the UE, and other suitable parameters.

For MIMO transmissions, each layer (or data stream) may be mapped to one of a plurality of antenna ports on the scheduling entity (e.g., transmitter 502). For example, the transmit antennas 504 may be mapped to antenna ports on the transmitter 502. Here, the term antenna port refers to a logical port over which a signal (e.g., a data stream or layer) may be transmitted. In an example, an antenna array on the scheduling entity may include 128 transmit antennas 504 (e.g., antenna elements within a 16×8 array) that may be mapped to 42 antenna ports by an 8×1 combiner.

The scheduling entity (e.g., transmitter 502) may maintain a codebook of precoding matrices and map the different transmission layers to a set of antenna ports on the scheduling entity using a selected precoding matrix. The precoding matrix provides the appropriate weightings to be applied to each layer for generation of the respective beam for each layer. The precoding matrix may be selected based on the PMI fed back from the scheduled entity in the CSI report. For example, using the PMI, the scheduling entity may select a particular precoding matrix from a codebook for a MIMO transmission.

Many different codebooks may be used. In some scenarios, codebooks can be Type 1 codebooks (single panel or multi-panel) or Type II codebooks. Type I codebooks include predefined precoding matrices based on the number of layers and antenna ports. Type II codebooks also include precoding matrices based on the number of layers and antenna ports. However, with Type II codebooks, the network entity uses wideband and sub-band indices fed back from the scheduled entity (e.g., receiver 506) to calculate the respective weightings applied to each layer for improved beamforming.

Beamforming is a signal processing technique that may be used at the transmitter 502 or receiver 506 to shape or steer an antenna beam (e.g., a transmit/receive beam) along a spatial path between the transmitter 502 and the receiver 506. Beamforming may be achieved by combining the signals communicated via antennas 504 or 508 (e.g., antenna elements of an antenna array) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station.

In some examples, to select one or more serving beams (e.g., one or more downlink transmit beams and one or more downlink receive beams) for communication with a UE, the base station may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the base station indicating the Layer 1 RSRP (L-1 RSRP) of each of the measured beams. The base station may then select the serving beam(s) for communication with the UE based on the beam measurement report. In other examples, when the channel is reciprocal, the base station may derive the particular beam(s) (e.g., the particular downlink beam(s)) to communicate with the UE based on uplink measurements of one or more uplink reference signals, such as a sounding reference signal (SRS).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub-6 GHz systems.

Figure 6:
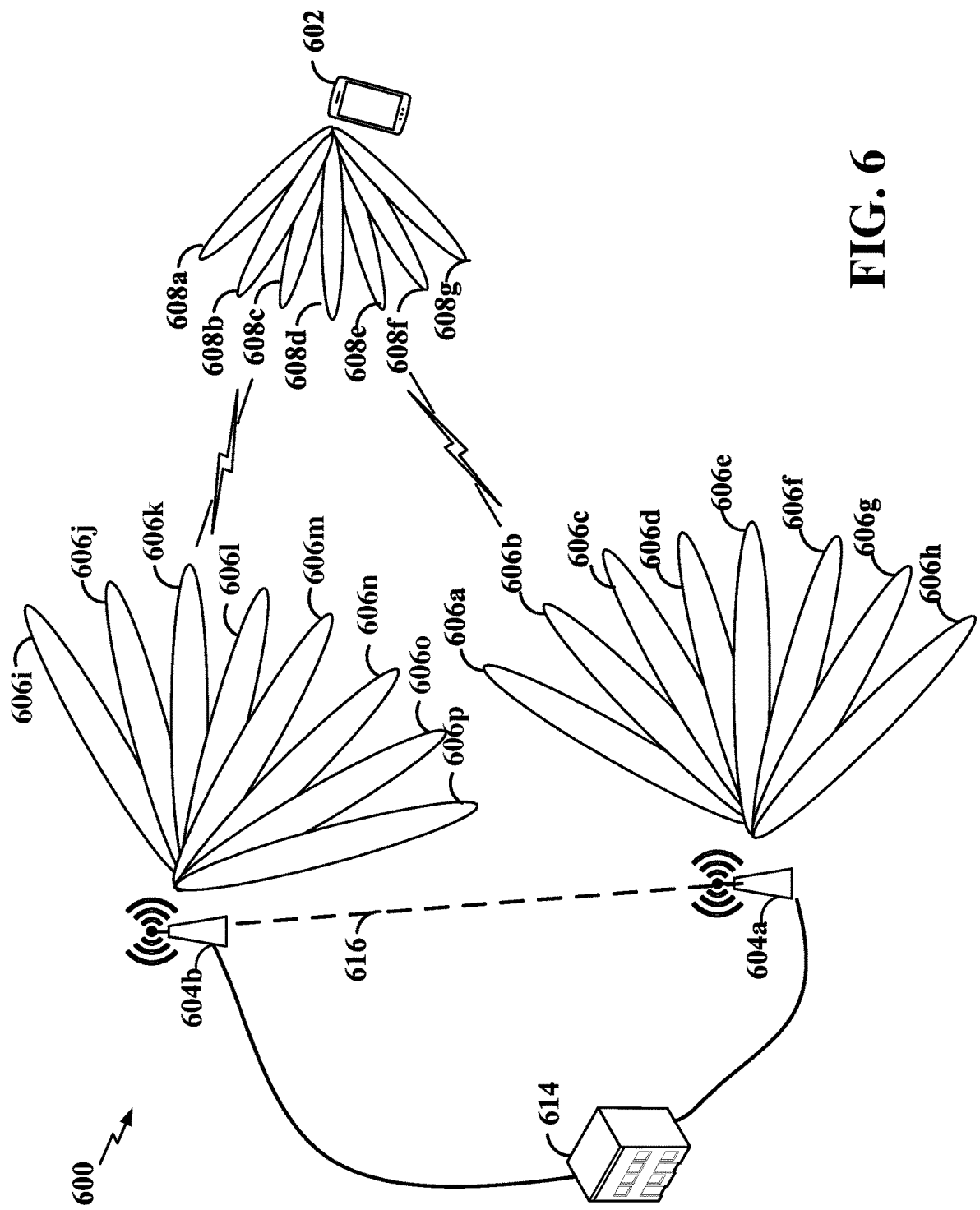
FIG. 6 is a diagram illustrating an example of beamforming in a multiple transmission and reception point (mTRP) environment according to some aspects.

FIG. 6 is a diagram illustrating an example of beamforming in a multiple transmission and reception point (mTRP) environment 600 according to some aspects. The multi-TRP environment 600 may include a plurality of TRPs 604a and 604b, two of which are illustrated for simplicity. The multi-TRP environment 600 may implement spatial division multiplexing (SDM) in which transmissions from the TRPs 604a and 604b may be simultaneously directed towards a single UE 602. In FIG. 6, communication may be between the UE 602 and a network entity 614 via at least one of the TRPs 604a and 604b. In such a multi-TRP environment 600, the multiple TRPs 604a and 604b may be collocated (e.g., at the same geographical location and coupled to the same antenna tower or pole) and/or non-collocated, the latter being illustrated.

The TRPs 604a and 604b may correspond to macro-cells, small cells, pico cells, femtocells, remote radio heads, relay nodes, or other nodes. Coordination among the TRPs 604a and 604b for transmission of multiple streams to the UE 602 may be facilitated by a network entity 614 (e.g., a centralized RAN node, a virtual RAN node, a base station, a gNB, or another type of network entity 614) or via backhaul signaling between the TRPs 604a and 604b. In the example shown in FIG. 6, each of the TRPs 604a and 604b may be remote radio heads (RRHs) of the network entity 614. In other examples, each of the TRPs 604a and 604b may be a separate base station and coordination may occur over an optional backhaul link 616. The network entity 614 combined with the first TRP 604a and the second TRP 604b may be any of the network entities (e.g., base stations, such as gNBs) or scheduling entities illustrated in FIGS. 1, 2, and/or 4. The UE 602 may be any of the UEs or scheduled entities illustrated in FIGS. 1, 2, and/or 4.

The network entity 614 may generally be capable of communicating with the UE 602 using one or more transmit beams 606a-606h, 606i-606p of one or more of the first TRP 604a and the second TRP 604b, respectively. The UE 602 may be capable of communicating with the network entity 614 via one or more of the first TRP 604a and the second TRP 604b using one or more receive beams 608a-608g. As used herein, the term transmit beam refers to any one of the one or more transmit beams 606a-606h, 606i-606p of one or more of the first TRP 604a and the second TRP 604b, respectively that may be utilized for downlink or uplink communication with the UE 602. In addition, the term receive beam refers to any one of the one or more receive beams 608a-608g of the UE 602 that may be utilized for downlink or uplink communication with the network entity 614 via one or more of the first TRP 604a and the second TRP 604b.

In the example shown in FIG. 6, each of the first TRP 604a and the second TRP 604b of the network entity 614 may be configured to generate a plurality of transmit beams 606a-606h and 606i-606p, respectively. Each of the plurality of transmit beams 606a-606p is associated with a different spatial direction. In addition, the UE 602 may be configured to generate the plurality of receive beams 608a-608g. Each of the plurality of receive beams 608a-608g is associated with a different spatial direction. It should be noted that while some beams are illustrated as adjacent to one another, such an arrangement may be different in different aspects. For example, transmit beams 606a-606h and/or 606i-606p transmitted during a same symbol may not be adjacent to one another. In some examples, the first TRP 604a, the second TRP 604b, and UE 602 may each transmit more or less beams distributed in all directions (e.g., 360 degrees) and in three-dimensions. In addition, the transmit beams 606a-606p may include beams of varying beam width. For example, each of the first TRP 604a and the second TRP 604b may transmit certain signals (e.g., SSBs) on wider beams and other signals (e.g., CSI-RSs) on narrower beams.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR, UEs are equipped with channel estimation, frequency offset error estimation and synchronization procedures for processing QCL. For example, if the UE knows that the radio channels corresponding to two different antenna ports are QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width. Here, the LSCPs and spatial properties may collectively be referred to as QCL parameters.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. For example, the TCI state can include one or more reference signal IDs, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

Figure 7:
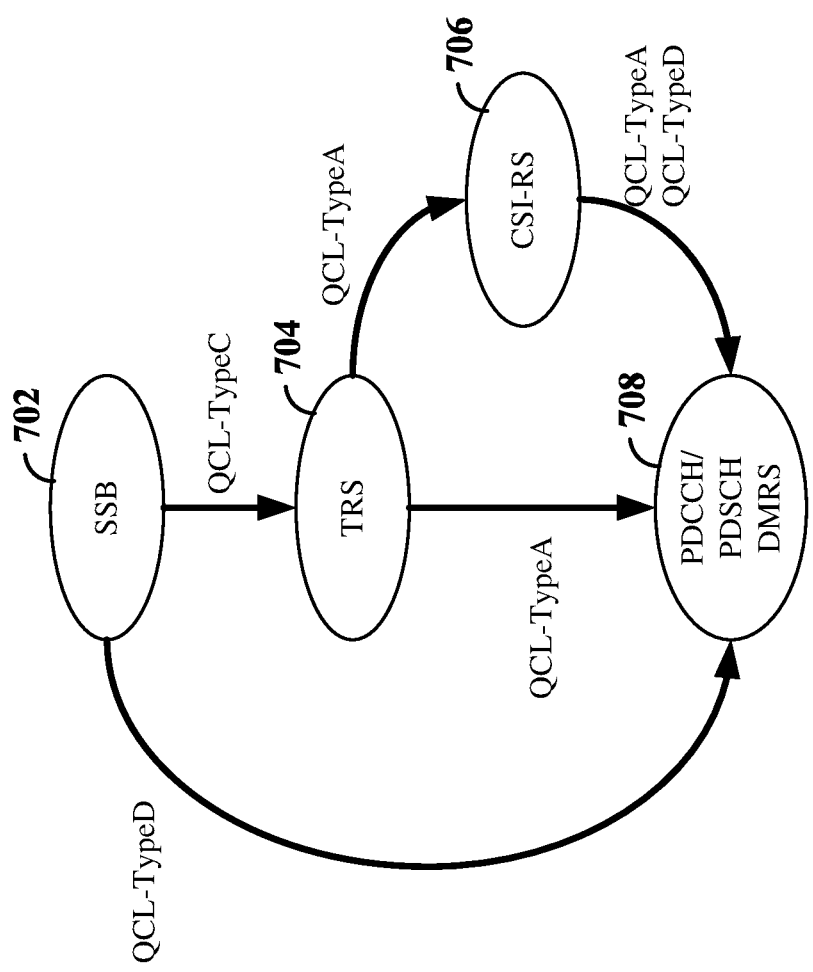
FIG. 7 is a diagram illustrating exemplary QCL relationships between downlink reference signals and other downlink transmissions according to some aspects.

FIG. 7 is a diagram illustrating exemplary QCL relationships between downlink reference signals and other downlink transmissions according to some aspects. As described above, a UE can be configured (e.g., via RRC signaling) with TCI states to demodulate and decode downlink transmissions, such as PDCCH and PDSCH transmissions. Each TCI state includes parameters for configuring the QCL relationship between one or two downlink reference signals and the DMRS ports of a PDCCH or PDSCH.

In the example shown in FIG. 7, three downlink reference signals, SSB 702, TRS 704, and CSI-RS 706 are illustrated. The QCL relationships between these downlink reference signals and between the downlink reference signals and the PDCCH/PDSCH DMRS ports 708 are shown. Each QCL relationship may be indicated via, for example, a TCI state. For example, the TCI state for a TRS 704 may indicate a QCL-TypeC relationship with an SSB 702. In addition, the TCI state for a CSI-RS 706 may indicate a QCL-TypeA relationship with a TRS 704. Furthermore, the TCI state for a PDCCH/PDSCH DMRS 708 may indicate a QCL-TypeA and/or QCL-TypeD relationship with a CSI-RS 706 and/or a QCL-TypeD relationship with an SSB 702.

Each TCI state may be configured via RRC using, for example, the following format.

```
TCI State ::=
    tci-StateID         SEQUENCE {
    qcl-Type1               TCI-StateID,
    qcl-Type2               QCL-Info,
    qcl-Type3               QCL-Info
    ...
}
QCL-Info ::=            SEQUENCE {
    cell                    ServCellIndex
    bwp-ID                  BWP-ID
    referenceSignal         CHOICE {
        csi-rs                  NZP-CSI-RS-ResourceID,
        ssb                     SSB-Index
    },
    qcl-Type                Enumerated (typeA, typeB, typeC,
                            typeD),
    ...
}
```

Once configured, the network entity may transmit a TCI state activation message to the UE to activate a TCI state on the UE for PDCCH or PDSCH transmissions. In some examples, the TCI state activation message is a medium access control (MAC) control element (MAC-CE). For example, up to 128 TCI states may be RRC-configured. In one example, for PDCCH, one TCI state may be activated by MAC-CE per CORESET. In one example, for PDSCH, up to eight TCI states may be activated by a MAC-CE (e.g., a TCI state activation message herein) that is mapped to eight respective TCI codepoints. A DCI may indicate one of the activated TCI states via a TCI field (e.g., DCI formats 1_1 and 1_2) for a transmission.

In single frequency networks (SFNs) in which two transmission reception points (TRPs) of a network entity may transmit the same downlink transmission to the UE on the same time-frequency resource, each TRP may be associated with a different TCI state. In this example, the network entity may transmit a single MAC-CE to activate the two different TCI states (e.g., each associated with a different TRP) for a SFN physical downlink shared channel (PDSCH) transmission. For example, the MAC-CE may include a TCI codepoint that maps to two TCI states.

Figure 8:
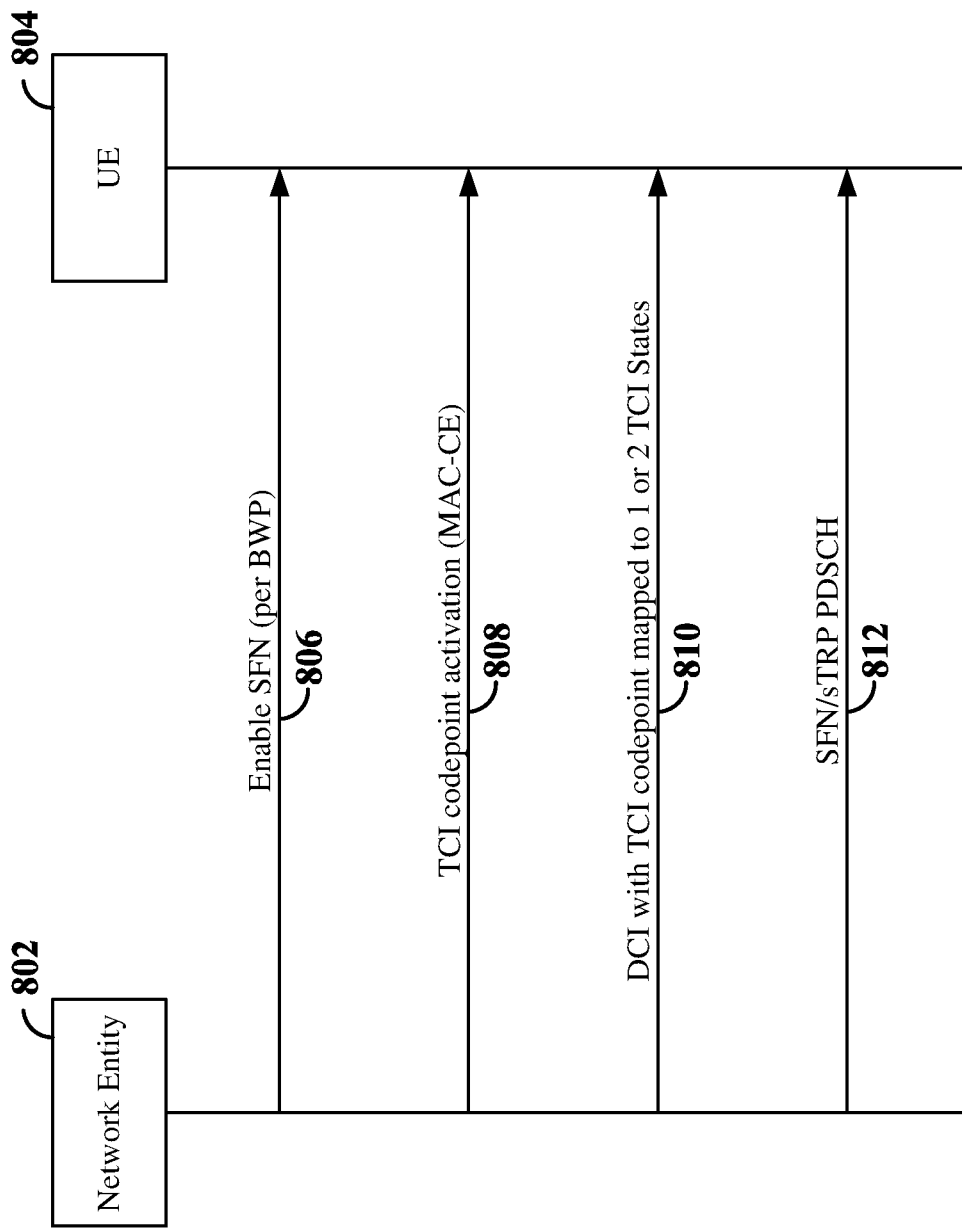
FIG. 8 is a signaling diagram illustrating exemplary signaling for a single frequency network (SFN) transmission between a network entity and a UE according to some aspects.

FIG. 8 is a signaling diagram illustrating exemplary signaling for a single frequency network (SFN) transmission between a network entity 802 and a UE 804 according to some aspects. The UE 804 may correspond, for example, to any of the UEs or other scheduled entities shown in FIGS. 1, 2, 5, and/or 6. The network entity 802 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, and/or 4-6.

At 806, the network entity 802 may transmit an RRC message enabling SFN operation on one or more bandwidth parts (BWPs). At 808, the network entity 802 may transmit a TCI state activation message including one or more TCI codepoints. For example, the network entity may transmit a MAC-CE including the TCI codepoints. Each TCI codepoint may map to one or two TCI states, depending on the transmission scheme (e.g., SFN or single TRP (sTRP)). In examples in which the transmission scheme is sTRP, each TCI codepoint may map to a single TCI state (e.g., associated with a single TRP). In examples in which the transmission scheme is SFN, each TCI codepoint may map to two TCI states, each associated with a respective TRP for a SFN transmission. In some examples, the MAC-CE may activate one or more TCI codepoints that map to a single TCI state and one or more TCI codepoints that map to two TCI states. By activating TCI codepoints that map to either single TCI states or two TCI states, dynamic switching between sTRP and SFN may be enabled based on UE capability.

At 810, the network entity may transmit downlink control information (DCI) scheduling a PDSCH transmission. The DCI may include an activated TCI codepoint (e.g., activated via the TCI state activation message at 808) for the PDSCH transmission. In examples in which dynamic switching between sTRP and SFN is supported by the UE, the number of TCI states mapped to the TCI codepoint in the DCI can be used to switch between single beam (sTRP) and multi-beam (SFN) PDSCH transmissions. Thus, the activated TCI codepoint may map to either a single TCI state (e.g., for an sTRP transmission of the PDSCH) or to two TCI states (e.g., for an SFN transmission of the PDSCH). However, when dynamic switching between sTRP and SFN is not supported by the UE, the UE may assume that all TCI codepoints are configured/activated with two TCI states. At 812, the network entity may transmit the sTRP or SFN PDSCH transmission to the UE.

High-speed trains (HSTs) may utilize SFNs to facilitate wireless communication. A user equipment (UE) located within a HST may move in a predefined path or trajectory (e.g., where a train track defines the predefined path or trajectory) at velocities exceeding 300 kilometers per hour. Remote radio heads or transmission and reception points (TRPs) may be deployed along the predefined path and associated with a network entity.

Figure 9:
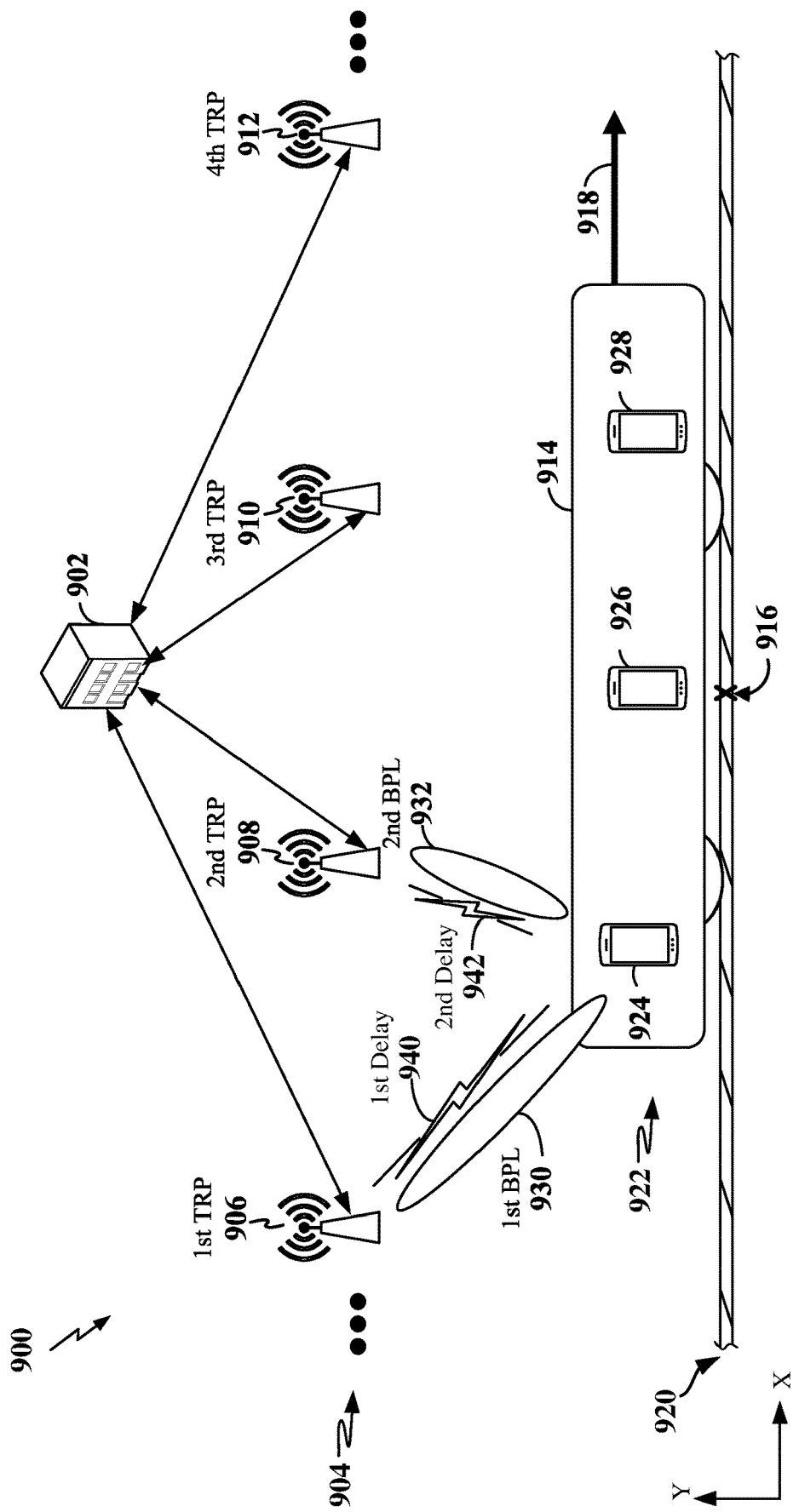
FIG. 9 is a right-side elevation view of a high-speed train car in a high-speed train (HST) single frequency network (HST-SFN) according to some aspects.

FIG. 9 is a right-side elevation view of a high-speed train car 914 in a high-speed train (HST) single frequency network (HST-SFN) 900 according to some aspects. As shown in FIG. 9, the HST-SFN 900 includes a network entity 902 utilizing a plurality of transmission and reception points (TRPs) 904 deployed in a remote radio head configuration. In the illustrated example, the plurality of TRPs 904 include a first TRP 906, a second TRP 908, a third TRP 910, and a fourth TRP 912; however, any number of TRPs is within the scope of the disclosure. The HST-SFN 900 also includes the high-speed train car 914 having a centerline located at a position marked by the letter X 916 and indicates that the high-speed train car 914 is moving along an X-axis in a direction described by a vector 918 along a path 920 (e.g., a high-speed track). The high-speed train car 914 may transport a plurality of UEs 922.

The plurality of UEs 922 may include a first UE 924, a second UE 926, and a third UE 928. Any number of UEs, from one to many, are within the scope of the disclosure. The plurality of UEs 922 may include a mobile handset, a tablet, a mobile phone, a customer premise equipment (CPE), or the like. The first UE 924 is offset from the centerline X 916 of the high-speed train car 914; however, because the first UE 924 is located within the high-speed train car 914, when the high-speed train car 914 is moving, the velocity, acceleration, and direction of movement of the first UE 924 may be considered to be the same as that of the high-speed train car 914.

The plurality of TRPs 904 may be located at positions adjacent to the path 920 (e.g., mounted adjacent to one another on the walls of a tunnel through which the path 920 transits, or on poles, towers, buildings, or overhead supports staggered along the length of the path 920). As described herein, the first UE 924 may be moving with the plurality of UEs 922 at a same velocity, in the same direction, and along the same path 920 (e.g., defined by train tracks) of the high-speed train car 914 relative to each of the plurality of TRPs 904 associated with the network entity 902. In the example of FIG. 9, the first UE 924 is moving along the X-axis in the direction indicated by the vector 918 (e.g., toward the right). The plurality of UEs 922 may be moving at a constant speed or with acceleration.

As shown in FIG. 9, the first UE 924 may communicate with the first TRP 906 via a first beam pair link 930. The first beam pair link may include a beam at the first TRP for transmission of downlink and reception of uplink (collectively referred to as the transmit beam) and include a beam of the first UE 924 for the reception of downlink and transmission of uplink (collectively referred to as the receive beam). The first UE 924 may also communicate with the second TRP 908 via a second beam pair link 932. Communication between the first UE 924 and two or more TRPs is within the scope of the disclosure.

It should be understood that each of the plurality of UEs 922 may be in communication with each of the plurality of TRPs 904 via respective beam pair links. While the description herein may use an example of communication between the first UE 924 and the first TRP 906 and the second TRP 908 (via the first beam pair link 930 and the second beam pair link 932, respectively), the first UE 924 may be in communication with any two or more of the plurality of TRPs 904 using respective beam pair links while implementing the concepts described herein. Further, each of the plurality of TRPs 904 may communicate with each of the plurality of UEs 922 via respective beam pair links and implement the concepts described herein.

In some examples, the first UE 924 may receive a downlink transmission (e.g., a PDCCH or PDSCH) from the network entity 902 via the first TRP 906 and the first beam pair link 930 and via the second TRP 908 and the second beam pair link 932. Each TRP 906 and 908 may transmit the same downlink transmission (e.g., the same PDCCH or PDSCH) on the same time-frequency resources. The downlink transmission received from the first TRP 906 on the first beam pair link 930 may have a first delay 940 (e.g., a delay between transmission from the first TRP 906 and reception at the first UE 924). In addition, the downlink transmission received from the second TRP 908 on the second beam pair link 932 may have a second delay 942 (e.g., a delay between transmission from the second TRP 908 and reception at the first UE 924).

The different delays result in different Doppler shifts and different power delay profiles (PDPs) (e.g., based on the average delay and delay spread) of the downlink transmission observed at the UE. Therefore, the UE may combine the QCL Type A parameters (e.g., Doppler parameters (e.g., Doppler shift and Doppler spread) and delay parameters (e.g., the average delay and delay spread)) from each of the received downlink transmissions to derive composite QCL Type A parameters for use in processing (e.g., demodulating and decoding) the received downlink transmission.

Figure 10B:
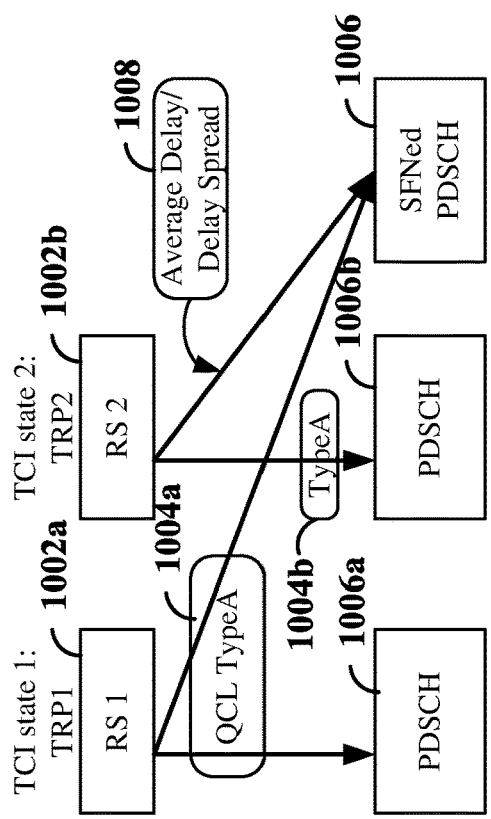
FIGS. 10A and 10B are diagrams illustrating exemplary SFN transmission schemes for deriving composite QCL parameters according to some aspects.
Figure 10A:
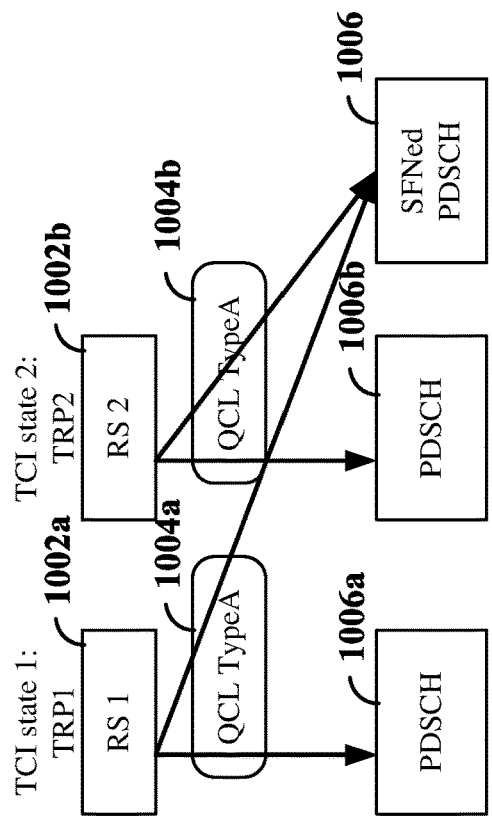

FIGS. 10A and 10B are diagrams illustrating exemplary SFN transmission schemes for deriving composite QCL parameters according to some aspects. In each of FIGS. 10A and 10B, a respective PDSCH 1006*a* and 1006*b* is sent from a first TRP (TRP1) and a second TRP (TRP2) on the same time-frequency resources to produce an SFNed PDSCH 1006. Each TRP (TRP1 and TRP2) is associated with a different respective TCI state (TCI state 1 for TRP1 and TCI state 2 for TRP2). Each TCI state identifies a respective reference signal RS1 1002 for TCI state 1 and RS2 1004 for TCI state 2 from which the UE may derive respective QCL parameters (e.g., QCL Type A parameters 1004*a* and 1004*b*). For example, the QCL Type A parameters (TypeA) 1004*a* for a PDSCH 1006*a* transmitted from TRP1 based on TCI state 1 may be derived from RS1 1002*a*. In addition, the QCL Type A parameters (TypeA) 1004*b* for a PDSCH 1006*b* transmitted from TRP2 based on TCI state 2 may be derived from RS2 1002*b*. The QCL Type A parameters include time domain parameters from which the PDP may be obtained (e.g., average delay and delay spread) and Doppler parameters (e.g., Doppler shift and Doppler spread).

In a first SFN transmission scheme, as shown in FIG. 10A, the UE may derive composite QCL Type A parameters (e.g., composite PDP and composite Doppler) for the SFNed PDSCH 1006 based on a combination of the QCL Type A parameters 1004*a* and 1004*b* associated with each of the TCI states (TCI state 1 and TCI state 2). In a second SFN transmission scheme, as shown in FIG. 10B, the UE may derive a composite PDP for the SFNed PDSCH 1006 from the QCL Type A parameters 1004*a* associated with TCI state 1 and the average delay/delay spread 1008 associated with TCI state 2. However, the Doppler parameters (Doppler shift and Doppler spread) for the SFNed PDSCH 1006 may be derived solely from the QCL Type A parameters 1004*a* associated with TCI state 1. As such, the Doppler parameters are not composite Doppler parameters for the SFNed PDSCH 1006 in the second SFN transmission scheme.

In either of the SFN transmission schemes shown in FIGS. 10A and 10B, composite QCL Type A parameters may be obtained based on an equal or predetermined weighting applied to each of the individual QCL Type A parameters 1004*a* and 1004*b*. As such, the combination weights applied to the individual QCL parameters in current SFN transmission schemes are fixed.

SFN transmissions may be considered as a subset of coherent joint transmissions (CJTs). CJTs may be transmitted across multiple (e.g., two or more) TRPs. For example, a PDSCH may be coherently and jointly transmitted from a plurality of TRPs of a network entity to a UE. In both CJT and SFN, one port (e.g., a DMRS port) can be associated with two (or more for CJTs) TCI states, each of which has quasi co-location (QCL) parameters associated therewith, such as QCL Type A parameters.

Figure 11:
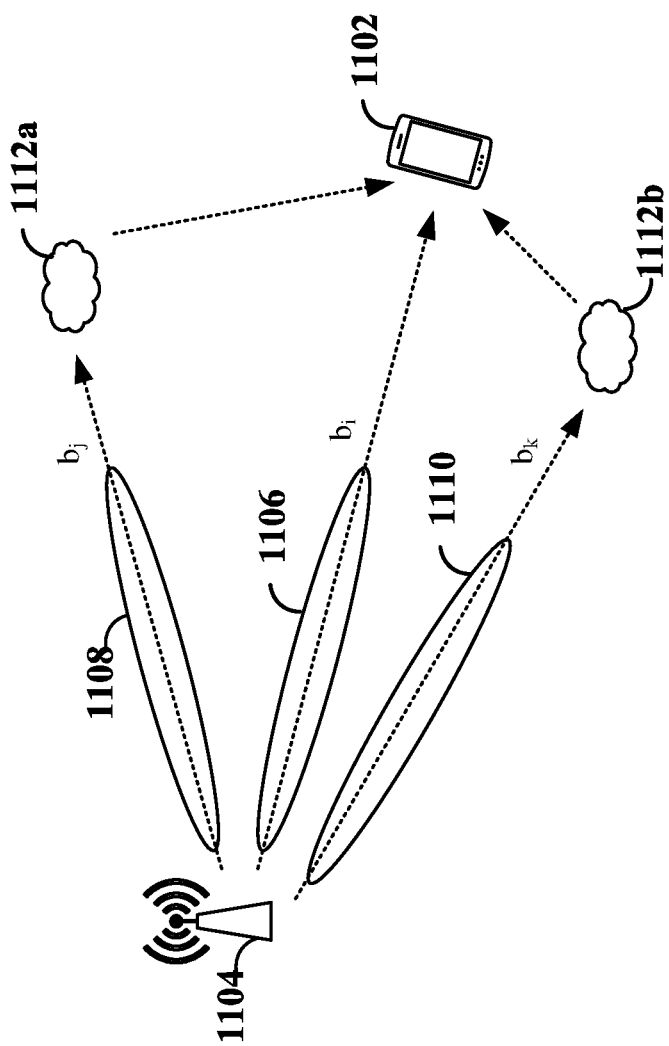
FIG. 11 is a diagram illustrating an exemplary CJT between a network entity and a UE according to some aspects.

FIG. 11 is a diagram illustrating an exemplary CJT between a network entity 1104 and a UE 1102 according to some aspects. The UE 1102 may correspond, for example, to any of the UEs or other scheduled entities shown in FIGS. 1, 2, 5, 6, 8, and/or 9. The network entity 1104 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, 4-6, 8, and/or 9.

The network entity 1104 includes a plurality of co-located TRPs (not specifically shown). Each TRP may be implemented, for example, as a respective antenna panel or subarray of an antenna panel mounted on a pole, tower, building, or other suitable structure. Each TRP may be configured to transmit on a single beam at a given time. In the example shown in FIG. 11, three TRPs are configured to transmit the same PDSCH on respective beams 1106, 1108, and 1110 within the same time-frequency resource(s) to produce a CJT of the PDSCH to the UE 1102. For example, each TRP may produce a respective PDSCH transmission, shown as bi, bj, and bk, which may be coherently combined to produce the CJT PDSCH. Each beam 1106, 1108, and 1110 may have a direct line-of-sight with the UE 1102 or indirect line-of-sight with the UE 1102. For example, beams 1108 and 1110 have an indirect line-of-sight such that the respective PDSCH transmissions are scattered off one or more scatterers 1112a and 1112b towards the UE 1102. The associated TCI state for the PDSCH transmission transmitted on each beam 1106, 1108, and 1110 may be indicated via DCI (e.g., using a single TCI codepoint mapping to three TCI states) or other mechanism. For example, a control resource set (CORESET) on which the DCI is transmitted may be associated with a particular TCI codepoint mapping to three TCI states.

To produce the CJT, the network entity 1104 may apply joint precoding across the multiple beams 1106, 1108, and 1110. For example, the beams 1106, 1108, and 1110 may be FR2 beams. For example, the network entity 1104 may apply joint precoding over respective CSI-RS ports, each associated with a respective CSI-RS resource indicator (CRI), based on precoding matrix indicators (PMI) and/or rank indicators (RI) reported by the UE 1102 in a CSI report. For example, the UE may report joint CQI, PMI, and RI for multiple CRIs in a CSI report.

Figure 12:
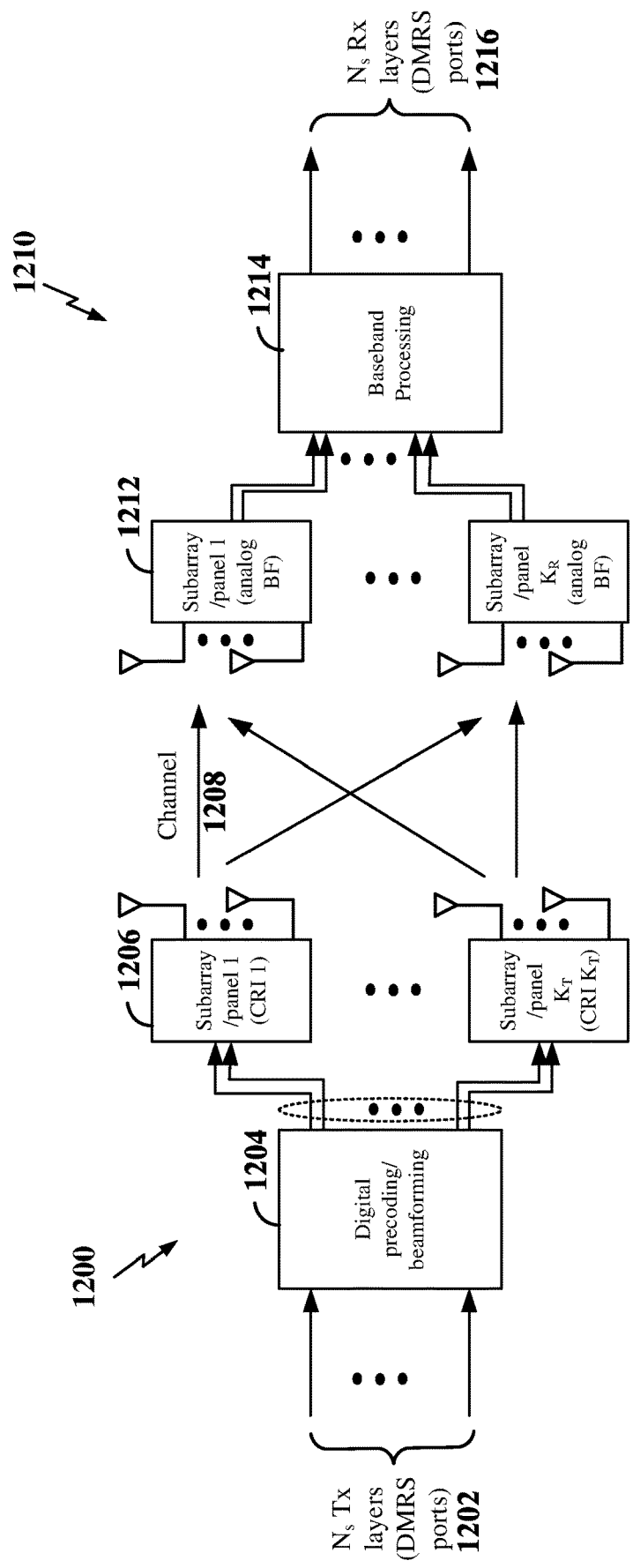
FIG. 12 is a diagram illustrating an example communication system for digital precoding of coherent joint transmissions (CJTs) from a network entity to a UE according to some aspects.

FIG. 12 is a diagram illustrating an example communication system for digital precoding of coherent joint transmissions (CJTs) from a network entity 1200 to a UE 1210 according to some aspects. The communication system shown in FIG. 12 may be configured for multi-beam communication using, for example, a Type II codebook multi-panel arrangement. In the example shown in FIG. 12, the network entity 1200 may include a digital precoding and beamforming module 1204 configured to receive a plurality of transmission layers 1202 for a MIMO communication (Ns Tx layers). Each transmission layer may be associated with a DMRS port. The output of the digital precoding and beamforming module 1204 may include CSI-RS ports coupled to inputs of multiple subarrays/antenna panels 1206 used for transmission of a CJT over a wireless channel 1208.

Each subarray/antenna panel 1206 may be associated with a different respective TRP. The UE 1210 may include multiple subarrays/antenna panels 1212 for analog beamforming and a baseband processing module 1214 for digital processing (e.g., demodulation and decoding) of the CJT to produce received layers 1216 (Ns Rx layers).

In the example shown in FIG. 12, each subarray/panel 1206 of the network entity 1200 may be implemented for a CRI (e.g., CRI1 . . . CRI $K_T$), where $K_T$ represents the quantity of CRIs. As illustrated, each CRI may be associated with two CSI-RS ports, resulting in 2K T virtual CSI-RS ports. In addition, each CRI may be associated with a different TCI state. The network entity 1200 may aggregate CSI-RS ports from multiple CRIs to form a pool of virtual CSI-RS ports. The multiple CRIs may or may not be surrounding or neighboring beams. The network entity may perform joint precoding of the one or more CSI-RS ports associated with each of the CRIs reported by the UE in a CSI report across the CRIs (subarrays/antenna panels 1206) to produce the CJT for transmission over the channel 1208 to the UE 1210.

Referring again to FIG. 11, a Type II combination of CRIs (e.g., beams 1106, 1108, and 1110) may be represented as: $a_i b_i + a_j b_j + a_k b_k$, where $a_i$, $a_j$, and $a_k$ are the combining weights applied to each of the transmissions. For joint precoding, the joint (composite) QCL parameters depend on the combination weights. As such, the network entity should specify the combining weights to enable the UE to derive the QCL information for downlink reception. However, the combining weights for QCL parameters of CJTs may not be specified and may not be implicitly determined. Moreover, in certain scenarios, dynamic indication of combining weights for SFN transmissions may be desirable.

Therefore, in aspects of the disclosure, the network entity may indicate the combining weights (a) for a UE to derive the composite QCL parameters. In some examples, a list of values for the weights may be configured (e.g., $0 \leq \alpha \leq 1$) and the network entity may indicate one of the configured values for $\alpha$. For example, if $\alpha_i$ is the weight for TCI, the UE can derive the QCL parameters by scaling the associated parameters. As an example, if the PDP associated with TCI is $PDP_i$, then the combined (composite) PDP may be derived as $PDP = \Sigma \alpha_i PDP_i$, with a constraint that $\Sigma_i \alpha_i = c$. In some examples, c may be set equal to one. For an SFN transmission (two TCI states), the joint PDP may be represented as $\alpha PDP_1 + (1-\alpha) PDP_2$. This may be extended to higher numbers of TCI states (e.g., 3 or more TCI states).

In some examples, each QCL parameter may have a separate weight or a common weight may be applied to each of the QCL parameters. For example, the QCL Type A parameters may each have a respective different (separate) weight as follows: $\alpha_i^{(1)}$ for Doppler shift combining, $\alpha_i^{(2)}$ for Doppler spread combining, $\alpha_i^{(3)}$ for average delay combining, and $\alpha_i^{(4)}$ for delay spread combining. In this example, the network entity may transmit an indication of the different respective weight to be applied to each of the plurality of QCL parameters for a TCI state of the plurality of TCI states of a SFN/CJT. For higher rank transmissions (e.g., when the number of DMRS ports is greater than one), the combining weights may be specified per DMRS port (or per layer). Thus, in this example, for each port (layer) of a plurality of ports (layers), the network entity may transmit a respective indication of the respective weight to be applied to each of a respective plurality of QCL parameters for each of a respective plurality of TCI states.

Figure 13:
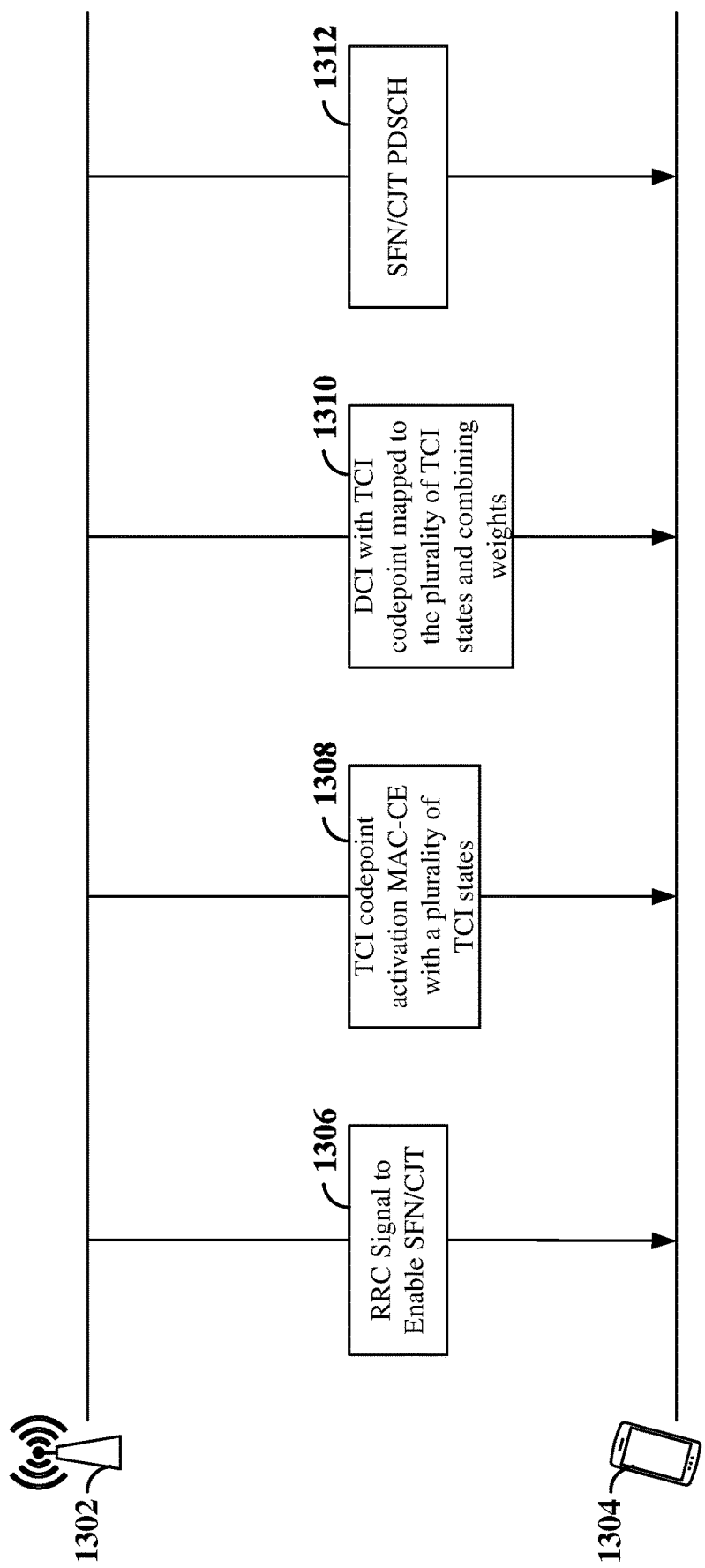
FIG. 13 is a signaling diagram illustrating exemplary signaling between a network entity and a UE for dynamic QCL parameter weight indication according to some aspects.

FIG. 13 is a signaling diagram illustrating exemplary signaling between a network entity 1302 and a UE 1304 for dynamic QCL parameter weight indication according to some aspects. The UE 1304 may correspond, for example, to any of the UEs or other scheduled entities shown in FIGS. 1, 2, 5, 6, 8, 9, 11, and/or 12. The network entity 1302 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, 4-6, 8, 9, 11, and/or 12.

At 1306, the network entity 1302 may transmit an RRC message enabling SFN/CJT operation on one or more bandwidth parts (BWPs). At 1308, the network entity 1302 may transmit a TCI state activation message including one or more TCI codepoints. For example, the network entity may transmit a MAC-CE including the TCI codepoints. In the example shown in FIG. 13, each TCI codepoint maps to a plurality of TCI states (e.g., two or more TCI states), each associated with a respective TRP for a SFN/CJT transmission.

At 1310, the network entity 1302 may transmit DCI including a TCI codepoint that is mapped to a plurality (e.g., two or more) of TCI states. In addition, the DCI may further include the combining weights to be applied to the TCI states (e.g., the QCL parameters for each of the TCI states). For example, the DCI may include a weight codepoint that is mapped to an explicit value of a from a pre-configured list of values for $\alpha$. If the UE does not support dynamic switching between mTRP schemes (e.g., between SFN/CJT and sTRP), the UE expects all TCI codepoints to be activated with two or more TCI states in a BWP. However, even in this scenario, the network entity may dynamically switch the precoding (e.g., combining weights) and indicate the combining weights to the UE 1304. At 1312, the network entity 1302 may transmit the SFN/CJT PDSCH to the UE 1304.

For Type II codebooks, the combining weights may be implicitly indicated by the CSI parameter values (e.g., PMI and/or RI) associated with amplitude coefficient indicators. With Type II codebooks, the network entity uses wideband and sub-band indices fed back from the UE to calculate the respective weightings applied to each layer for improved beamforming. As discussed above, this concept (e.g., Type II codebooks) can be extended to multi-beam transmissions per layer. For example, the wideband amplitude coefficient for the L beam in a Type II codebook may be selected from:

TABLE 1

| Wideband Amplitude Coefficients | |
|---|---|
| $k_{l,i}^{(1)}$ | $p_{l,i}^{(1)}$ |
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 | where $k_{l,i}^{(1)}$ is the wideband amplitude coefficient indicator and $p_{l,i}^{(1)}$ is the wideband amplitude coefficient. Similarly, the sub-band amplitude coefficient for the L beam in a Type II codebook may be selected from:

TABLE 2

| Sub-band Amplitude Coefficients | |
|---|---|
| $k_{l,i}^{(2)}$ | $p_{l,i}^{(2)}$ |
| 0 | $\sqrt{1/2}$ |
| 1 | 1 | where $k_{l,i}^{(2)}$ is the sub-band amplitude coefficient indicator and $p_{l,i}^{(2)}$ is the sub-band amplitude coefficient.

A mapping may be defined between the combining weight ($\alpha$) for the QCL parameters of two or more TCI states and the wideband and sub-band amplitude coefficients. For example, $(p_{l,i}^{(1)}, p_{l,i}^{(2)}) \rightarrow \alpha_i$. In this example, the combining weights ($\alpha_i$) may be implicitly indicated by the UE through CSI reporting. In this example, the network entity may follow the CSI reporting and use the combining weights mapped to the wideband and sub-band amplitude coefficients reported by the UE or the network entity may select different combining weights. In either example, the network entity may indicate to the UE the selected combining weights for a CJT.

Figure 14:
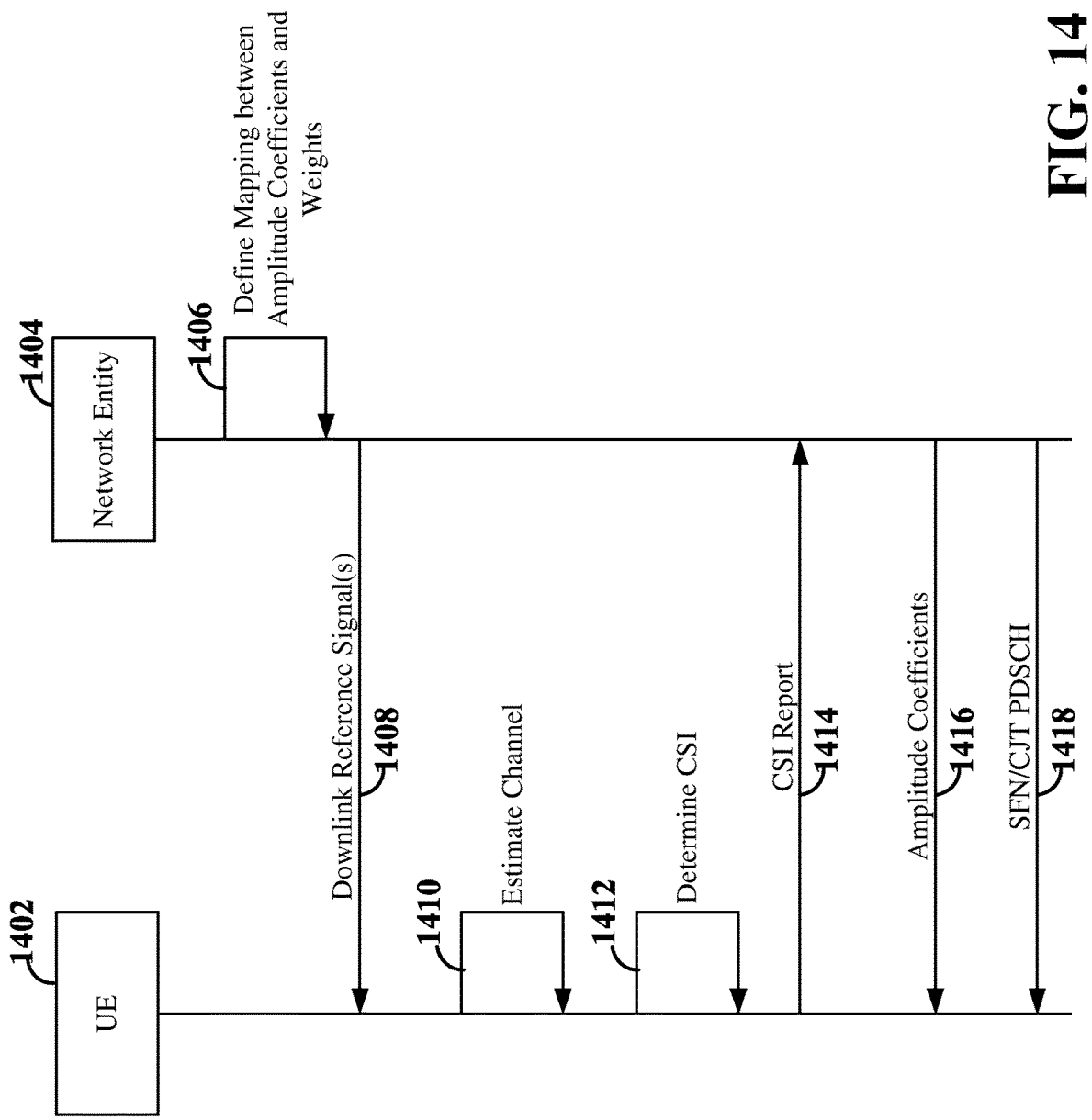
FIG. 14 is a signaling diagram illustrating exemplary signaling between a UE and a network entity for channel state information reporting for SFN/CJT according to some aspects.

FIG. 14 is a signaling diagram illustrating exemplary signaling between a UE 1402 and a network entity 1404 for channel state information reporting for SFN/CJT according to some aspects. The UE 1402 may correspond, for example, to any of the UEs or other scheduled entities shown in FIGS. 1, 2, 5, 6, 8, 9, 11, and/or 13. The network entity 1404 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, 4-6, 8, 9, 11, and/or 13.

At 1406, the network entity 1404 may define a mapping between amplitude coefficients for Type II codebooks and combining weights to be applied to QCL parameters of SFN/CJT PDSCH transmissions. In some examples, the mapping may be pre-configured on the network entity 1404 and the UE 1042 (e.g., by respective original equipment manufacturers (OEMs) based on one or more standards or specification). In other examples, the network entity 1404 may generate the mapping and transmit the mapping (e.g., via RRC signaling or MAC-CE) to the UE 1402.

At 1408, the network entity 1404 may transmit a downlink reference signal, such as a CSI-RS, to the UE 1402. In some examples, the downlink reference signal may include a plurality of downlink reference signals. Each downlink reference signal may be transmitted via a respective CSI resource (indicated by a CSI resource indicator (CRI)). CSI resources may include time-frequency resources, along with a beam direction (spatial direction), within which a particular downlink reference signal can be transmitted. In addition, each downlink reference signal may include a number of pilots allocated within the respective CSI resource. In some examples, the different spatial directions of the CSI resources may support MIMO (e.g., spatial multiplexing) and/or SFN/CJT. For example, different spatial directions may be associated with different TRPs.

At 1410, the UE 1402 can estimate the downlink wireless channel from the downlink reference signal(s). For example, the UE 1402 may measure the SINR of one or more of the downlink reference signals to obtain a downlink channel estimate of the downlink wireless channel.

At 1412, for example, the UE 1402 may determine the CSI. For example, the UE 1402 may determine CSI parameters, such as a rank indicator (RI), precoding matrix indicator (PMI), channel quality indicator (CQI), and layer indicator (LI) from the downlink channel estimate. The CQI may include an index (e.g., a CQI index) ranging, for example, from 0 to 16. The CQI index may indicate, for example, the highest MCS at which the Block Error Rate (BLER) of the channel does not exceed 10%. Once selected, the RI, PMI, LI, and CQI index can be fed back in a CSI report. For example, at 1414, the UE 1402 may transmit the CSI report, including the selected CQI, along with the RI, PMI, and LI, to the network entity 1404.

The network entity 1404 may use the CSI report to select a rank for the scheduled entity, along with a precoding matrix and a MCS to use for future downlink transmissions to the UE 1402. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

For joint precoding across layers (MIMO) or beams/TCI states (SFN/CJT), the CSI report may include multiple sets of CSI parameters, each for a respective one of a plurality of CRIs. In addition, for Type II codebooks, the CSI report may further include, for example, wideband and sub-band amplitude coefficient indices. For example, the PMI may indicate selected amplitude coefficients selected by the UE 1402 for a subsequent SFN/CJT. In some examples, the network entity 1404 may use the selected amplitude coefficients received in the CSI report to combine the beams/TCI states based on the mapping. In other examples, the network entity 1404 may combine the beams/TCI states using different beams and/or different weights (e.g., a different mapping between amplitude coefficients and weights).

At 1416 and 1418, the network entity 1404 may transmit the actual amplitude coefficients used by the network entity 1404 in transmitting an SFN/CJT PDSCH. For example, the actual amplitude coefficients may be included in DCI scheduling the SFN/CJT PDSCH (e.g., similar to that shown in FIG. 13). The actual amplitude coefficients may correspond to the selected amplitude coefficients selected by the UE 1402 or other amplitude coefficients selected by the network entity 1404. In some examples, at 1418, the network entity 1404 may transmit the CJT using a first weight associated with the actual (e.g., the selected or other) amplitude coefficients based on the mapping. The first weight may be applied by the network entity 1404 to a first TCI state of a plurality of TCI states for the SFN/CJT PDSCH. In this example, remaining weights to be applied to remaining TCI states of the plurality of TCI states may be derived from the first weight as indicated above. Based on the actual amplitude coefficients and the mapping, the UE 1402 may identify the QCL combining weights utilized by the network entity 1404 for the SFN/CJT PDSCH to ensure proper demodulation and decoding of the SFN/CJT PDSCH.

Figure 15:
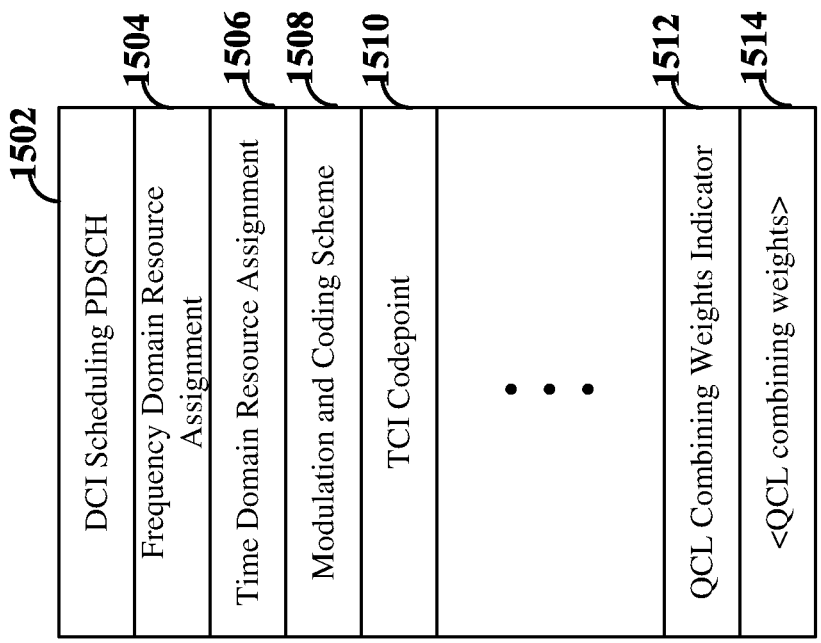
FIG. 15 is a diagram illustrating an example DCI format indicating QCL parameter combining weights according to some aspects.

FIG. 15 is a diagram illustrating an example DCI format indicating QCL parameter combining weights according to some aspects. The DCI format 1502 shown in FIG. 15 is a DCI format scheduling a PDSCH. The DCI format includes a plurality of fields indicating, for example, a frequency domain resource assignment 1504, a time domain resource assignment 1506, and a modulation and coding scheme (MCS) 1508 for the SFN/CJT PDSCH. In some examples, the DCI format 1502 may further optionally include a TCI codepoint 1510 that maps to two or more TCI states for the SFN/CJT PDSCH, along with additional fields (not shown for simplicity). In addition, the DCI format 1502 may include a QCL combining weights indicator 1512. The QCL combining weights indicator 1512 may be a bit field in the scheduling DCI 1502 configured to indicate whether the SFN/CJT PDSCH is using the same amplitude coefficients (selected amplitude coefficients) as reported in the Type II CSI feedback by the UE to identify the QCL combining weights (e.g., based on the mapping).

In some examples, the DCI format 1502 may exclude the QCL combining weights indicator 1512 (e.g., the QCL combining weights indicator may not be present in the DCI format 1502) to indicate that the QCL combining weights are to be determined based on the mapping of the selected amplitude coefficients reported in the Type II CSI feedback. Thus, if no additional QCL combining weights indicator bit field is configured in the DCI format 1502, the UE may implicitly identify the QCL combining weights based on the previous CSI report and the mapping. In other examples, one of the codepoints of the QCL combining weights indicator bit field 1512 may be used to indicate that the UE should identify the QCL combining weights based on the previous CSI report and the mapping. For example, the bit field 1512 may have a value set to indicate that the respective weights used for the SFN/CJT are associated with the selected amplitude coefficients of the previous CSI report based on the mapping. In either of the above examples, the previous CSI report may be a last CSI report sent from the UE to the network entity or a latest CSI report sent from the UE to the network entity prior to a processing gap associated with the SFN/CJT PDSCH. For example, if the last CSI report sent from the UE to the network entity is too close to the SFN/CJT PDSCH, the last CSI report may not be used by the network entity in scheduling the SFN/CJT PDSCH. Therefore, a processing gap may be defined to identify the CSI report to use for the SFN/CJT PDSCH. For example, the processing gap may be defined such that a latest CSI report that is at least X ms or slots before the scheduling DCI 1502 or the scheduled SFN/CJT PDSCH is used in identifying the QCL combining weights.

In other examples, other codepoints of the QCL combining weights indicator bit field 1512 may be used to indicate that the UE should identify the QCL combining weights based on other amplitude coefficients (e.g., actual amplitude coefficients used by the network entity for the SFN/CJT PDSCH) and the mapping. For example, the bit field 1512 may have a value set to indicate that the respective weights used for the SFN/CJT are associated with other amplitude coefficients based on the mapping. In this example, the DCI format 1502 may further optionally include a QCL combining weights field that indicates the QCL combining weights. For example, the QCL combining weights field may include the QCL combining weight (a) or the actual (other) amplitude coefficients used for the SFN/CJT PDSCH. In some examples, the network entity may indicate the QCL combining weights as a delta (offset) with respect to the previous reported (selected) amplitude coefficients $(p_{l,i}^{(1)}, p_{l,i}^{(2)})$. In some examples, the QCL combining weights indicator field 1512 may be excluded and the DCI format may include the QCL combining weights (a) or the actual amplitude coefficients or a respective offset value for each of the previous selected amplitude coefficients (selected by the UE in the CSI report).

Figure 16:
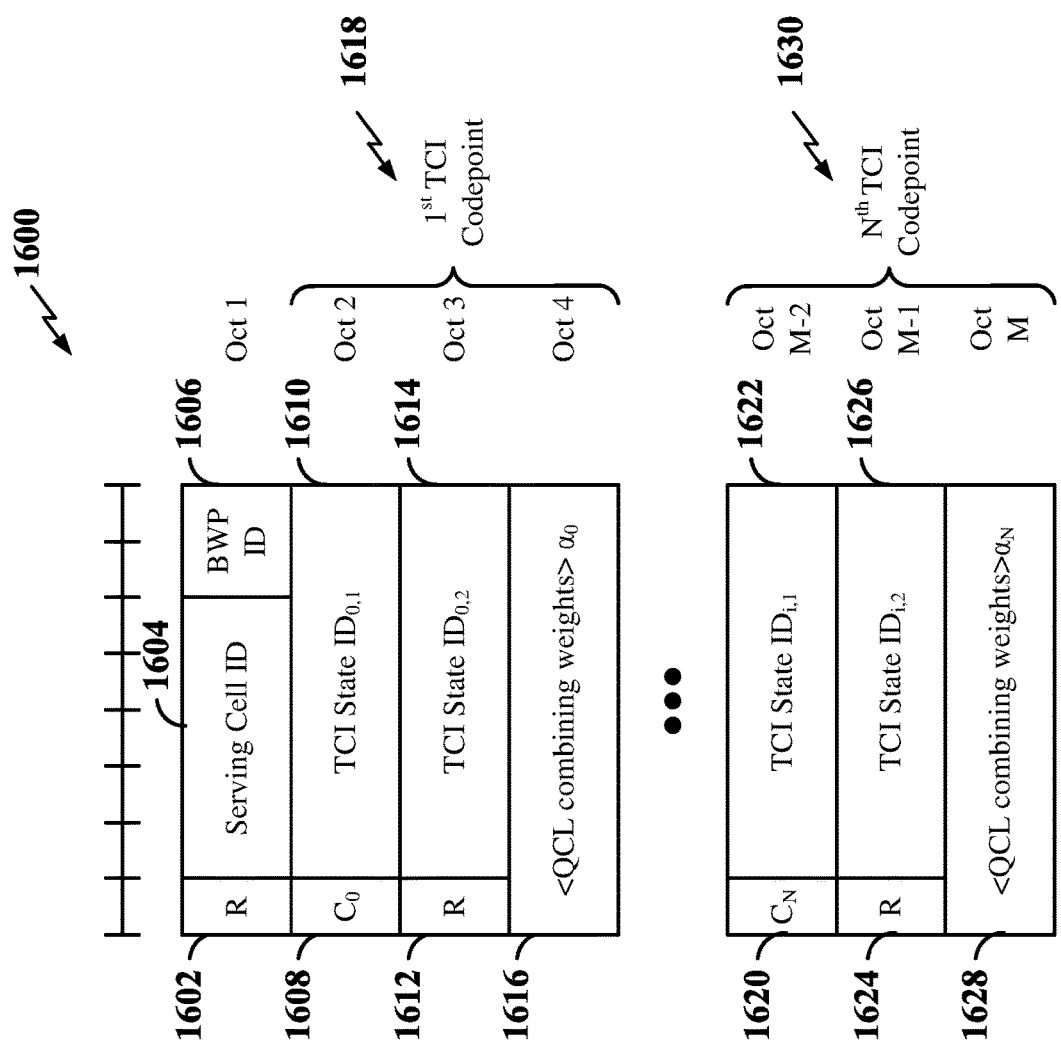
FIG. 16 is a diagram illustrating an example of a TCI state activation message according to some aspects.

FIG. 16 is a diagram illustrating an example of a TCI state activation message 1600 (e.g., illustrated as a MAC-CE) according to some aspects. Although the TCI state activation message 1600 is depicted as a MAC-CE, other mechanisms and/or signaling may be used to convey some or all of the information presented in the TCI state activation message 1600 of FIG. 16. All such other mechanisms and/or signaling are within the scope of the disclosure. According to the aspect presented in FIG. 16, the TCI state activation message 1600 may be eight bits wide and M octets in length, where M is a positive integer. However, these dimensions are exemplary; the TCI state activation message 1600 may have a variable width and/or a variable length.

The TCI state activation message 1600 may include a reserved field 1602, a Serving Cell ID 1604 field, and a bandwidth part ID (BWP ID) 1606 in a first octet thereof. The Serving Cell ID 1604 field may indicate the identity of the serving cell for which the TCI state activation message 1600 applies. In the example, the length of the Serving Cell ID 1604 field is 5 bits. Other lengths are within the scope of the disclosure. The BWP ID 1606 field may indicate a DL BWP for which the TCI state activation message 1600 applies. In the example, the length of the BWP ID 1606 field is 2 bits. Other lengths are within the scope of the disclosure.

The TCI state activation message 1600 may include a plurality of C 1608, 1620 fields. Each of the plurality of Ci 1608, 1620 fields may indicate whether an octet containing TCI state $ID_{i,2}$ is present, where $0 \le i \le 1$ plus the maximum number of TCI codepoints associated with the TCI state activation message 1600. In other words, each of the plurality of $C_i$ 1608, 1620 fields may indicate whether a second TCI state is associated with an $i^{th}$ TCI codepoint. In one example, if the $C_i$ 1608, 1620 field is set, the octet containing TCI state $ID_{i,2}$ is present. In the example, if the $C_i$ 1608, 1620 field is not set, the octet containing TCI state $ID_{i,2}$ is not present.

The TCI state activation message 1600 may include a plurality of TCI state $ID_{i,j}$ 1610, 1614, 1622, 1626 fields, where i is the index of the TCI codepoint 1618, 1630 of the TCI state field and $0 \le i \le (1$ plus the maximum number of TCI codepoints 1618, 1630 associated with the TCI state activation message 1600) and $j=\{1, 2\}$. If more than two TCI states are mapped to a given TCI codepoint, then the set of j may be expanded to cover the additional TCI states. As shown in the example, each of the plurality of $ID_{i,j}$ 1610, 1614, 1622, 1626 fields indicate the TCI state identified by a TCI state ID. The TCI state $ID_{i,j}$ denotes the $j^{th}$ TCI state indicated for the $i^{th}$ codepoint in a transmission configuration indication field of a DCI (not shown), for example.

The TCI state activation message 1600 may further include a plurality of QCL combining weights ($\alpha_i$) 1616, 1628 fields, where i is the index of the TCI codepoint to which the QCL combining weights 1616, 1628 are mapped to. For example, the QCL combining weights 1616, 1628 may include a coefficient value mapping to a first QCL combining weight for the first TCI state 1610, 1622 for the associated TCI codepoint. Remaining combining weights for remaining TCI states 1614, 1626 for each TCI codepoint may be determined based on the first QCL combining weight. For example, if the PDP associated with $TCI_i$ is $PDP_i$, then the combined (composite) PDP may be derived as $PDP=\Sigma \alpha_i PDP_i$, with a constraint that $\Sigma_i \alpha_i=c$. In some examples, c may be set equal to one. As another example, for an SFN transmission (two TCI states), the joint PDP may be represented as $\alpha PDP_1 + (1-\alpha) PDP_2$. In other examples, the QCL combining weights 1616, 1628 may include a respective QCL combining weight for each TCI state. In this example, additional octets may be included to indicate the respective QCL combining weights, with each QCL combining weight being mapped to a corresponding TCI state based on the ordinal position of the QCL combining weights and associated TCI states for a TCI codepoint.

In some examples, the TCI state activation message 1600 may further include reserved fields 1612 and 1624 for each of the TCI codepoints 1618, 1630. The reserved fields 1612 and 1624 may be set to indicate whether the QCL combining weights field 1616, 1628 is present for a particular TCI codepoint. For example, if the reserved field 1624 is set to one, the QCL combining weight field 1628 for the TCI codepoint 1630 may be present in the TCI state activation message 1600. Otherwise, if the reserved field 1624 is set to zero, the QCL combining weight field 1628 for the TCI codepoint 1630 may not be present. In this example, if no weights are indicated, the UE may assume equal weights or may use the QCL combining weights 1616 indicated in the previous TCI codepoint 1618 (or a subsequent TCI codepoint depending on implementation).

The TCI codepoint to which the TCI states and associated QCL combining weights are mapped may be determined by its ordinal position among all the TCI codepoints with sets of TCI state $ID_{i,j}$ fields. For example, TCI state $ID_{0,1}$ 1610, TCI state $ID_{0,2}$ 1614, and QCL combining weights $\alpha_0$ may be mapped to the $1^{st}$ TCI codepoint 1618 (which has a TCI codepoint index value (i) of 0); the next set of TCI state $ID_{1,1}$ (not shown), TCI state $ID_{1,2}$ (not shown), and QCL combining weights $\alpha_1$ (not shown) may be mapped to the $2^{nd}$ TCI codepoint (not shown) (which has the TCI codepoint index value of 1); the final set of the TCI state $ID_{i,1}$ 1622, TCI state $ID_{i,2}$ 1626, and QCL combining weights a N may be mapped to an $N^{th}$ TCI codepoint 1630 (which has a TCI codepoint value of i) (for example only, i may be equal to 8). N may be the total number of TCI codepoints in the TCI state activation message 1600.

Figure 17:
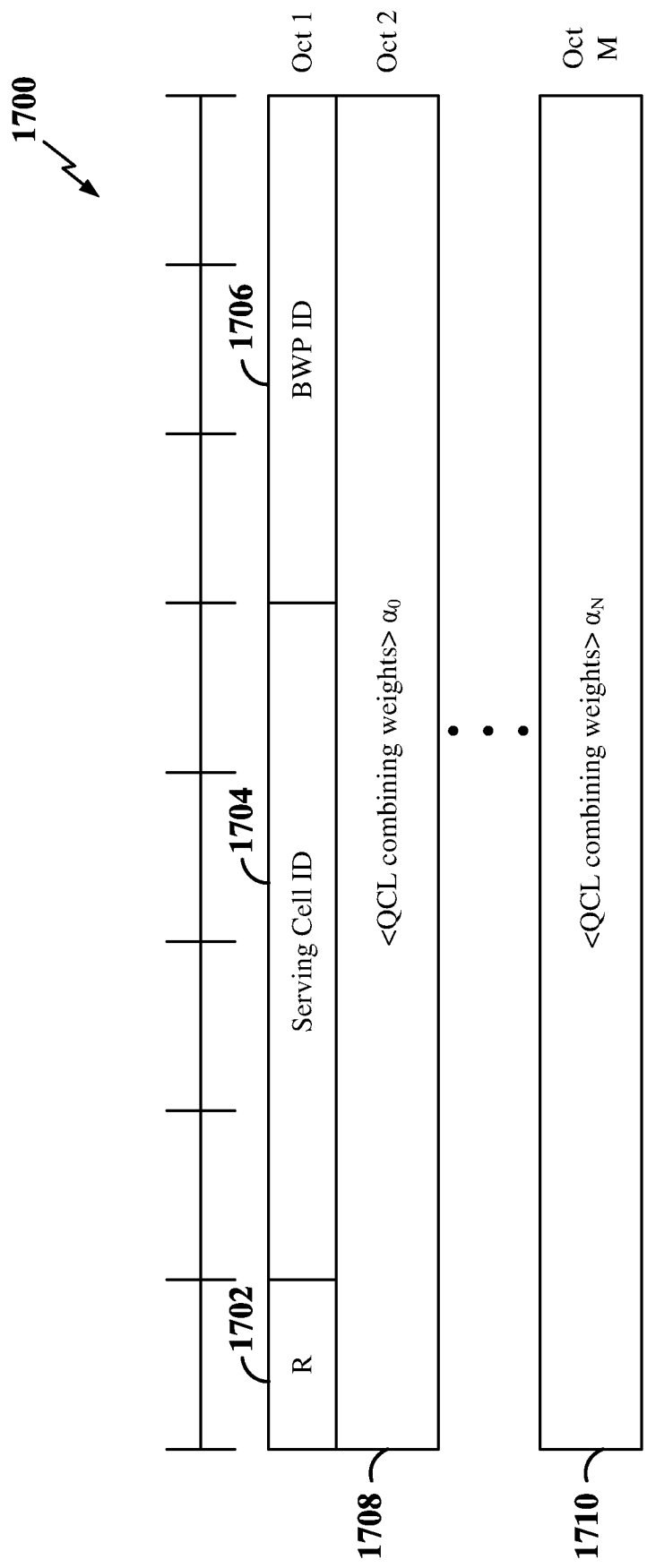
FIG. 17 is a diagram illustrating an example of a QCL combining weights message according to some aspects.

FIG. 17 is a diagram illustrating an example of a QCL combining weights message 1700 (e.g., illustrated as a MAC-CE) according to some aspects. Although the QCL combining weights message 1700 is depicted as a MAC-CE, other mechanisms and/or signaling may be used to convey some or all of the information presented in the QCL combining weights message 1700 of FIG. 17. All such other mechanisms and/or signaling are within the scope of the disclosure. According to the aspect presented in FIG. 17, the QCL combining weights message 1700 may be eight bits wide and M octets in length, where M is a positive integer. However, these dimensions are exemplary; the QCL combining weights message 1700 may have a variable width and/or a variable length.

The QCL combining weights message 1700 may include a reserved field 1702, a Serving Cell ID 1704 field, and a bandwidth part ID (BWP ID) 1706 in a first octet thereof. The Serving Cell ID 1704 field may indicate the identity of the serving cell for which the QCL combining weights message 1700 applies. In the example, the length of the Serving Cell ID 1704 field is 5 bits. Other lengths are within the scope of the disclosure. The BWP ID 1706 filed may indicate a DL BWP for which the QCL combining weights message 1700 applies. In the example, the length of the BWP ID 1706 field is 2 bits. Other lengths are within the scope of the disclosure.

The QCL combining weights message 1700 may further include a plurality of QCL combining weights (a) 1708, 1710 fields, where i is the index of the TCI codepoint to which the QCL combining weights 1708, 1710 are mapped to. For example, the QCL combining weights 1708, 1710 may include a coefficient value mapping to a first QCL combining weight for a first TCI state for the associated TCI codepoint. Remaining combining weights for remaining TCI states for each TCI codepoint may be determined based on the first QCL combining weight. For example, if the PDP associated with TCL is $PDP_i$, then the combined (composite) PDP may be derived as $PDP=\Sigma\alpha_i PDP_i$, with a constraint that $\Sigma_i \alpha_i = c$. In some examples, c may be set equal to one. As another example, for an SFN transmission (two TCI states), the joint PDP may be represented as $\alpha PDP_1 + (1-\alpha)PDP_2$. In other examples, the QCL combining weights 1708, 1710 may include a respective QCL combining weight for each TCI state. In this example, additional octets may be included to indicate the respective QCL combining weights, with each QCL combining weight being mapped to a corresponding TCI state based on the ordinal position of the QCL combining weights and associated TCI states for a TCI codepoint.

The TCI codepoint to which the QCL combining weights are mapped may be determined by its ordinal position among all the TCI codepoints in a corresponding TCI state activation message (e.g., a separate TCI state activation MAC-CE). For example, QCL combining weights $\alpha_0$ may be mapped to a first TCI codepoint (which has a TCI codepoint index value (i) of 0); the next set of QCL combining weights $\alpha_1$ (not shown) may be mapped to the second TCI codepoint (which has the TCI codepoint index value of 1); the final set of QCL combining weights a N may be mapped to an $N^{th}$ TCI codepoint (which has a TCI codepoint value of i) (for example only, i may be equal to 8). N may be the total number of TCI codepoints in the corresponding TCI state activation message.

Each TCI state may be configured via RRC to indicate a QCL relationship between one or two reference signals (e.g., CSI-RS, SSB) and the DMRS ports of a PDSCH/PDCCH or CSI-RS ports. Once activated (e.g., via MAC-CE), a UE can expect PDCCH/PDSCH/CSI-RS transmissions with one (or more for SFN/CJT) of the activated TCI states, as indicated via DCI. If there is a beam change, a new TCI state may be activated (if pre-configured via RRC) or a new TCI state may be configured (via RRC). For a pre-configured TCI state, the source reference signal (RS) is also configured, and cannot be changed via MAC-CE. To change the source RS, either a previously configured TCI state can be newly activated (via MAC-CE) or a new TCI state with the preferred new source RS may be configured via RRC and then activated via MAC-CE.

In some examples, instead of specifying only up to two source RS for a TCI state, an extended set of three or more RSs may be configured per TCI state. For example, instead of one CSI-RS resource, multiple CSI-RS resources (e.g., NZP CSI-RS $ResourceID_i$) or a CSI-RS resource set may be configured. In addition to or in lieu of multiple CSI-RS resources, multiple SSB resources (SSB-Index) may be configured using, for example, the following format.

```
TCI State ::=
    tci-StateID            SEQUENCE {
    qcl-Type1              TCI-StateID,
    qcl-Type2              QCL-Info,
    qcl-Type3              QCL-Info
    ...
}
QCL-Info ::=               SEQUENCE {
    cell                   ServCellIndex
    bwp-ID                 BWP-ID
    referenceSignal        CHOICE {
```

-continued

```
        csi-rs             NZP-CSI-RS-ResourceID_i,
        ssb                SSB-Index_i
    },
    qcl-Type               Enumerated (typeA, typeB, typeC,
                           typeD),
    ...
}
```

Thus, the TCI state may be a linear combination of the indicated source (basis) reference signals (RSs). Such an RRC configuration of TCI states may be considered as an enhanced TCI state configuration. With the enhanced TCI state configuration, during TCI state activation or TCI indication via DCI, the network entity may adjust the linear combining weights.

Figure 18:
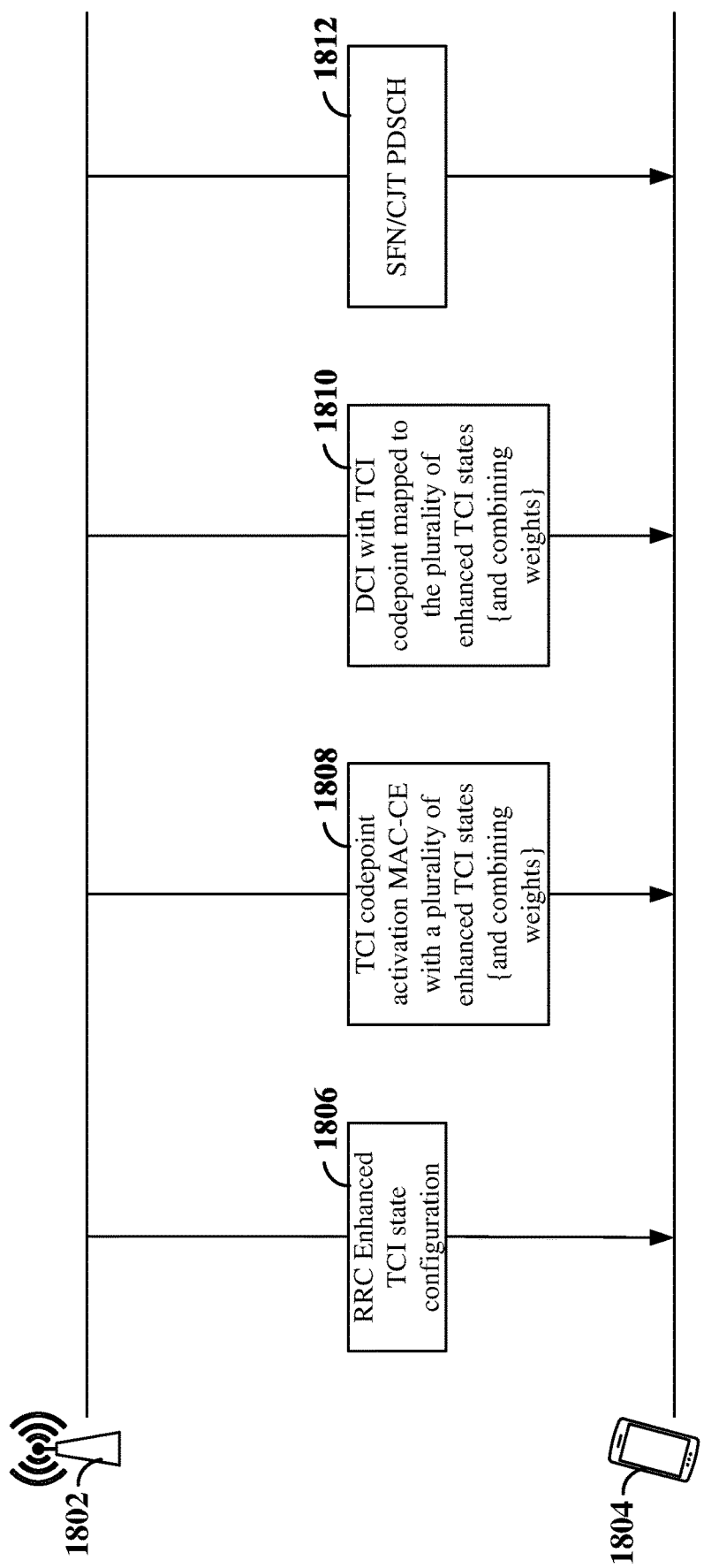
FIG. 18 is a signaling diagram illustrating exemplary signaling between a network entity and a UE for QCL parameter weight indication for enhanced TCI state configuration according to some aspects.

FIG. 18 is a signaling diagram illustrating exemplary signaling between a network entity 1802 and a UE 1804 for QCL parameter weight indication for enhanced TCI state configuration according to some aspects. The UE 1804 may correspond, for example, to any of the UEs or other scheduled entities shown in FIGS. 1, 2, 5, 6, 8, 9, and/or 11-14. The network entity 1802 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, 4-6, 8, 9, and/or 11-14.

At 1806, the network entity 1802 may transmit an RRC message including an enhanced TCI state configuration. At 1808, the network entity 1802 may transmit a TCI state activation message including one or more TCI codepoints. For example, the network entity may transmit a MAC-CE including the TCI codepoints. In the example shown in FIG. 18, each TCI codepoint maps to a plurality of enhanced TCI states (e.g., two or more enhanced TCI states), each associated with a respective TRP for a SFN/CJT transmission. In addition, the TCI state activation message may further optionally include the QCL combining weights for the enhanced TCI states.

At 1810, the network entity 1802 may transmit DCI including a TCI codepoint that is mapped to a plurality (e.g., two or more) of enhanced TCI states. In addition, the DCI may further optionally include the combining weights to be applied to the enhanced TCI states (e.g., the QCL parameters for each of the enhanced TCI states). For example, the DCI may include a weight codepoint that is mapped to an explicit value of a from a pre-configured list of values for $\alpha$. At 1812, the network entity 1802 may transmit the SFN/CJT PDSCH to the UE 1804.

Figure 19:
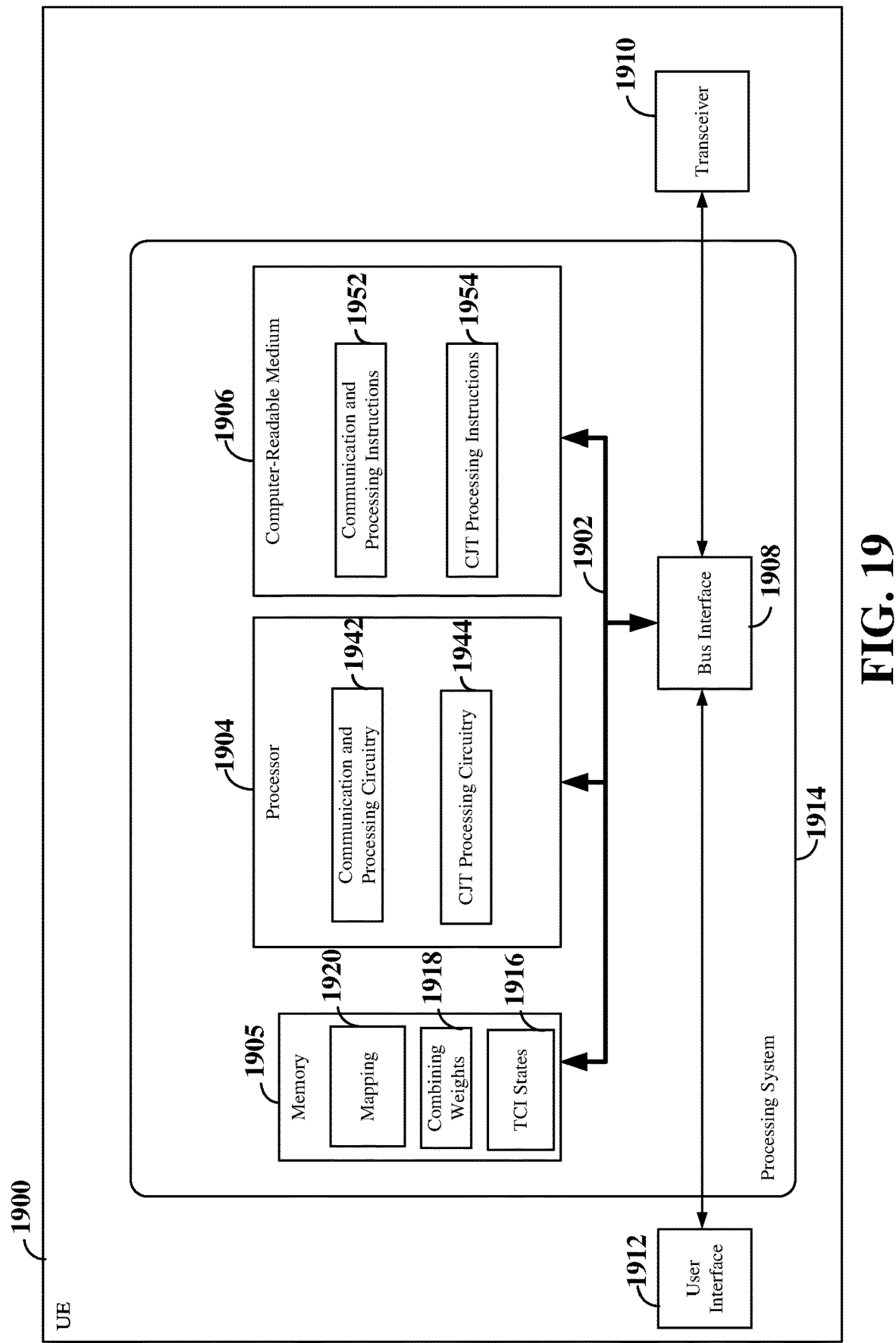
FIG. 19 is a block diagram illustrating an example of a hardware implementation of a user equipment (UE) employing a processing system according to some aspects.

FIG. 19 is a block diagram illustrating an example of a hardware implementation of a user equipment (UE) 1900 employing a processing system 1914 according to some aspects. The UE 1900 may be any of the UEs or other scheduled entities illustrated in any one or more of FIGS. 1, 2, 5, 6, 8, 9, 11-14, and/or 18.

In accordance with various aspects of the disclosure, an element, or any portion of an element, or any combination of elements may be implemented with a processing system 1914 that includes one or more processors, such as processor 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1900 may be configured to perform any one or more of the functions described herein. That is, the processor 1904, as utilized in the UE 1900, may be used to implement any one or more of the methods or processes described herein.

The processor 1904 may in some instances be implemented via a baseband or modem chip and in other implementations, the processor 1904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 communicatively couples together various circuits, including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, are not described any further.

A bus interface 1908 provides an interface between the bus 1902 and a transceiver 1910. The transceiver 1910 may be, for example, a wireless transceiver. The transceiver 1910 provides a means for communicating with various other apparatus over a transmission medium (e.g., air interface). The transceiver 1910 may further be coupled to one or more antennas/antenna arrays (not shown). The bus interface 1908 further provides an interface between the bus 1902 and a user interface 1912 (e.g., keypad, display, touch screen, speaker, microphone, control features, etc.). Of course, such a user interface 1912 may be omitted in some examples.

The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities including the processing system 1914. The computer-readable medium 1906 may be embodied in a computer program product. By way of example, a computer program product may include a computer-readable medium in packaging materials. In some examples, the computer-readable medium 1906 may be part of the memory 1905. Those skilled in the art will recognize how best to implement the described functionality presented throughout this disclosure depending on the particular application and the overall design constraints imposed on the overall system. In some examples, the computer-readable medium 1906 may be implemented on an article of manufacture, which may further include one or more other elements or circuits, such as the processor 1904 and/or memory 1905.

The computer-readable medium 1906 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1904, may be responsible for managing the bus 1902 and general processing, including the execution of the software (e.g., instructions or computer-executable code) stored on the computer-readable medium 1906. The software, when executed by the processor 1904, causes the processing system 1914 to perform the various processes and functions described herein for any particular apparatus. The computer-readable medium 1906 and/or the memory 1905 may also be used for storing data that may be manipulated by the processor 1904 when executing software. For example, the memory 1905 may store one or more of TCI states 1916, combining weights 1918 (e.g., QCL combining weights), and a mapping 1920 between amplitude coefficients (e.g., wideband and sub-band Type II codebook amplitude coefficients) and the combining weights 1918. The TCI states 1916 may be configured on the UE 1900 via, for example, RRC signaling. In some examples, the TCI states may be enhanced TCI states.

In some aspects of the disclosure, the processor 1904 may include circuitry configured for various functions. For example, the processor 1904 may include communication and processing circuitry 1942 configured to communicate with a network entity (e.g., an aggregated or disaggregated base station, such as a gNB or eNB). In some examples, the communication and processing circuitry 1942 may be configured to communicate with the network entity via two or more TRPs (e.g., within a SFN or CJT network). In some examples, the communication and processing circuitry 1942 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1942 may include one or more transmit/receive chains.

In some implementations where the communication involves receiving information, the communication and processing circuitry 1942 may obtain information from a component of the UE 1900 (e.g., from the transceiver 1910 that receives the information via radio frequency signaling or some other type of signaling suitable for the applicable communication medium), process (e.g., decode) the information, and output the processed information. For example, the communication and processing circuitry 1942 may output the information to another component of the processor 1904, to the memory 1905, or to the bus interface 1908. In some examples, the communication and processing circuitry 1942 may receive one or more of signals, messages, other information, or any combination thereof. In some examples, the communication and processing circuitry 1942 may receive information via one or more channels. In some examples, the communication and processing circuitry 1942 may include functionality for a means for receiving. In some examples, the communication and processing circuitry 1942 may include functionality for a means for processing, including a means for demodulating, a means for decoding, etc.

In some implementations where the communication involves sending (e.g., transmitting) information, the communication and processing circuitry 1942 may obtain information (e.g., from another component of the processor 1904, the memory 1905, or the bus interface 1908), process (e.g., modulate, encode, etc.) the information, and output the processed information. For example, the communication and processing circuitry 1942 may output the information to the transceiver 1910 (e.g., that transmits the information via radio frequency signaling or some other type of signaling suitable for the applicable communication medium). In some examples, the communication and processing circuitry 1942 may send one or more of signals, messages, other information, or any combination thereof. In some examples, the communication and processing circuitry 1942 may send information via one or more channels. In some examples, the communication and processing circuitry 1942 may include functionality for a means for sending (e.g., a means for transmitting). In some examples, the communication and processing circuitry 1942 may include functionality for a means for generating, including a means for modulating, a means for encoding, etc.

In some examples, the communication and processing circuitry 1942 may be configured to receive, from the network entity and via the transceiver 1910, an indication of a respective weight (combining weight 1918) to be applied to each of a plurality of QCL parameters for each of a plurality of TCI states 1916 stored within, for example, memory 1905. Each of the TCI states 1916 may be associated with a single port (e.g., a DMRS port). In addition, each of the TCI states 1916 may be associated with a respective TRP of a plurality of TRPs associated with the network entity. In some examples, the plurality of QCL parameters may include Doppler shift, Doppler spread, average delay, and delay spread. In some examples, each respective weight 1918 is one of a plurality of configured values between zero and one. In some examples, each of the plurality of QCL parameters for a TCI state of the plurality of TCI states 1916 includes a different respective weight 1918 or a common weight 1918 that is common among the plurality of QCL parameters. In some examples, for each port of a plurality of ports, the communication and processing circuitry 1942 may be configured to receive a respective indication of a respective weight 1918 to be applied to each of a respective plurality of QCL parameters for each of a respective plurality of TCI states 1916.

In some examples, the communication and processing circuitry 1942 may be configured to receive downlink control information (DCI) including at least one codepoint mapped to at least one of the respective weights 1918. In some examples, the communication and processing circuitry 1942 may be configured to receive a medium access control (MAC) control element (MAC-CE) including a TCI codepoint activating the plurality of TCI states 1916 and further comprising the indication of the respective weights. In some examples, the communication and processing circuitry 1942 may be configured to receive a MAC-CE including the indication of the respective weights 1918. In this example, the MAC-CE may include a respective indication for each of a plurality of TCI codepoints activated via a separate MAC-CE. Each of the plurality of TCI codepoints is associated with a respective plurality of TCI states 1916. In addition, each of the respective indications is associated with a respective one of the plurality of TCI codepoints based on a respective ordinal position of each of the respective indications in the MAC-CE.

The communication and processing circuitry 1942 may further be configured to receive a coherent joint transmission (CJT) transmitted across the plurality of TRPs via the transceiver 1910. In some examples, the communication and processing circuitry 1942 may be configured to transmit a channel state information (CSI) report including a precoding matrix indicator (PMI) indicating selected amplitude coefficients of a plurality of amplitude coefficients of a Type II codebook. In some examples, the communication and processing circuitry 1942 may be configured to receive DCI including or excluding a bit field indicating whether the respective weights used for the CJT are based on the selected amplitude coefficients or other amplitude coefficients different than the selected coefficients. The communication and processing circuitry 1942 may further be configured to execute communication and processing software 1952 stored on the computer-readable medium 1906 to implement one or more functions described herein.

The processor 1904 may further include CJT processing circuitry 1944, configured to process the CJT using composite QCL parameters generated based on the respective weights 1918. In some examples, the indication of the respective weight (combining weight 1918) to be applied to each of a plurality of QCL parameters for each of a plurality of TCI states 1916 includes a first weight to be applied to a first TCI state of the plurality of TCI states 1916. In this example, the CJT processing circuitry 1944 may be configured to derive remaining weights 1918 to be applied to remaining TCI states of the plurality of TCI states 1916 from the first weight.

In some examples, the CJT processing circuitry 1944 may be configured to identify the mapping 1920 between the plurality of amplitude coefficients of a Type II codebook and the plurality of weights. The mapping 1920 may be stored, for example, in memory 1905. The mapping 1920 may be received from the network entity via the transceiver 1910 and the communication and processing circuitry 1942 or may be pre-configured on the UE 1900 (e.g., by the OEM of the UE).

In some examples, the CJT processing circuitry 1944, together with the communication and processing circuitry 1942 and transceiver 1910, may be configured to receive the CJT using a first weight associated with the selected amplitude coefficients (e.g., indicated in the CSI report) based on the mapping 1920. The first weight may be applied to a first TCI state of the plurality of TCI states. The CJT processing circuitry 1944 may further be configured to derive remaining weights to be applied to remaining TCI states of the plurality of TCI states from the first weight. In some examples, the bit field in the DCI may have a value set to indicate that the respective weights used for the CJT are associated with the selected amplitude coefficients based on the mapping 1920. In some examples, the CSI report may include a last sent CSI report or a latest sent CSI report prior to a processing gap associated with the CJT.

In some examples, the CJT processing circuitry 1944, together with the communication and processing circuitry 1942 and the transceiver 1910, may be configured to receive the CJT using the respective weights associated with other amplitude coefficients based on the mapping. The other amplitude coefficients may be different than the selected amplitude coefficients (e.g., indicated in the CSI report). In this example, the bit field in the DCI received by the communication and processing circuitry 1942 may indicate that the respective weights used for the CJT are associated with the other amplitude coefficients based on the mapping. In some examples, the DCI may further include an indication of the other amplitude coefficients. In some examples, the indication of the other amplitude coefficients may include a respective offset value for each of the selected amplitude coefficients. In some examples, the DCI may exclude the bit field to indicate that the respective weights 1918 used for the CJT are associated with the selected amplitude coefficients based on the mapping 1920. The CJT processing circuitry 1944 may further be configured to execute CJT processing software 1954 stored on the computer-readable medium 1906 to implement one or more functions described herein.

Figure 20:
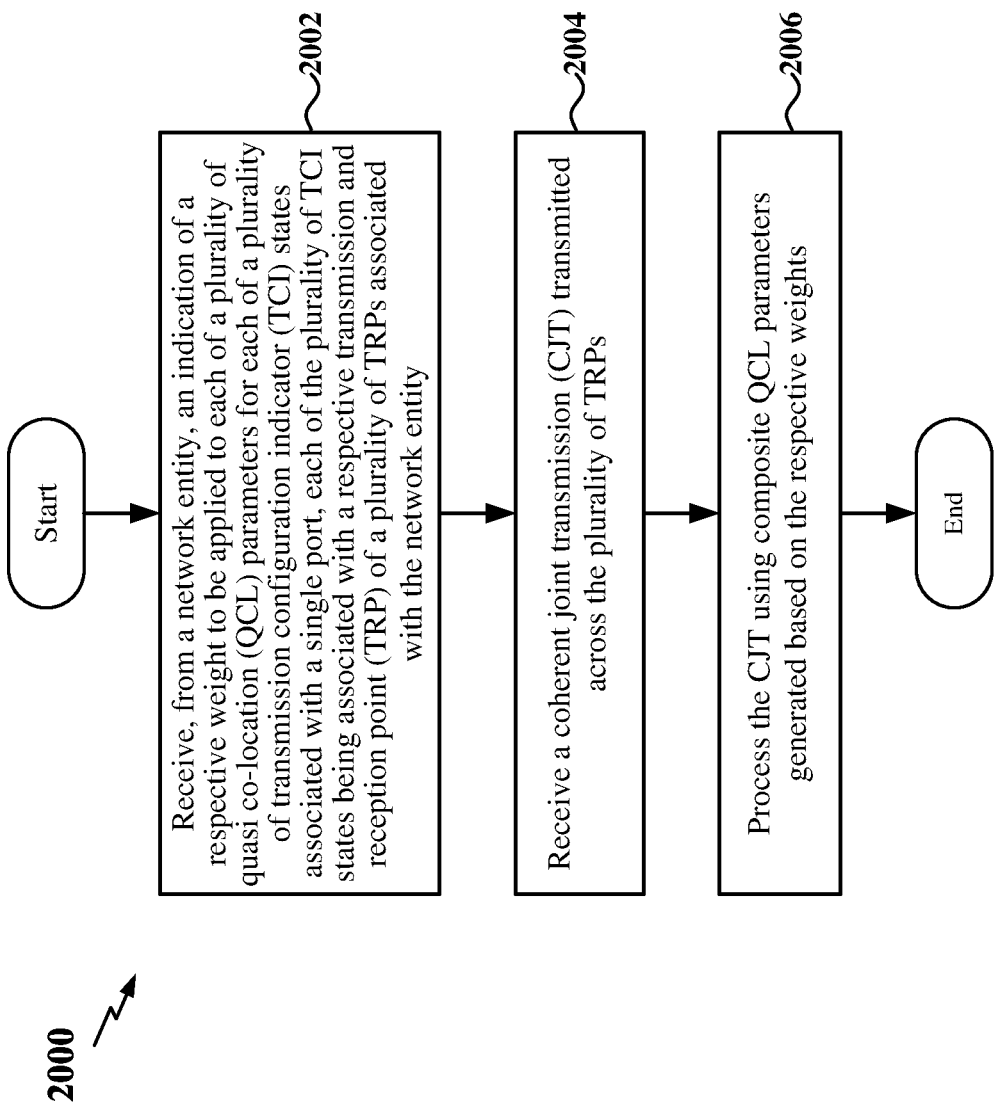
FIG. 20 is a flow chart illustrating an exemplary method of processing a CJT using QCL parameter combining weights according to some aspects.

FIG. 20 is a flow chart illustrating an exemplary method 2000 of processing a CJT using QCL parameter combining weights according to some aspects. In some examples, the method 2000 may be utilized in a SFN or CJT network. In some examples, the method 2000 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 2000 may be performed by the UE 1900, as described herein and illustrated in FIG. 19, by a processor or processing system, or by any suitable means for carrying out the described functions.

At block 2002, the UE may receive, from a network entity, an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs associated with the network entity. In some examples, the indication includes a first weight to be applied to a first TCI state of the plurality of TCI states. In this example, the UE may derive remaining weights to be applied to remaining TCI states of the plurality of TCI states from the first weight.

In some examples, the UE may receive downlink control information (DCI) comprising at least one codepoint mapped to at least one of the respective weights. In some examples, the UE may receive a medium access control (MAC) control element (MAC-CE) comprising a TCI codepoint activating the plurality of TCI states and further including the indication of the respective weights. In some examples, the UE may receive a medium access control (MAC) control element (MAC-CE) including the indication of the respective weights. In some examples, each of the QCL parameters of the plurality of TCI states includes a respective set of two or more QCL parameters and the indication comprises a respective indication of the respective weight to be applied to each of two or more QCL parameters for each of the QCL parameters of each of the plurality of TCI states. For example, the communication and processing circuitry 1942 together with the transceiver 1910, shown and described above in connection with FIG. 19, may provide a means for receiving the indication of the respective weight to be applied to each of the plurality of TCI states.

At block 2004, the UE may receive a coherent joint transmission (CJT) transmitted across the plurality of TRPs. For example, the communication and processing circuitry 1942 together with the transceiver 1910, shown and described above in connection with FIG. 19, may provide a means for receiving the CJT.

At block 2006, the UE may process the CJT using composite QCL parameters generated based on the respective weights. In some examples, the UE may identify a mapping between a plurality of amplitude coefficients of a Type II codebook and a plurality of weights. In addition, the UE may transmit a channel state information (CSI) report comprising a precoding matrix indicator (PMI) indicating selected amplitude coefficients of the plurality of amplitude coefficients. In this example, the UE may receive the CJT using a first weight associated with the selected amplitude coefficients based on the mapping, the first weight being applied to a first TCI state of the plurality of TCI states. The UE may further derive remaining weights to be applied to remaining TCI states of the plurality of TCI states from the first weight.

In some examples, the UE may receive the CJT using the respective weights associated with other amplitude coefficients based on the mapping, the other amplitude coefficients being different than the selected amplitude coefficients. In addition, the UE may receive downlink control information (DCI) including a bit field indicating that the respective weights used for the CJT are associated with the other amplitude coefficients based on the mapping, the DCI further including an indication of the other amplitude coefficients. For example, the CJT processing circuitry 1944 shown and described above in connection with FIG. 19 may provide the means for processing the CJT.

In one configuration, the UE 1900 includes means for receiving, from a network entity, an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs associated with the network entity, means for receiving a coherent joint transmission (CJT) transmitted across the plurality of TRPs, and means for processing the CJT using composite QCL parameters generated based on the respective weights. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, 5, 6, 9, 11, and/or 12, and utilizing, for example, the processes and/or algorithms described herein in relation to FIGS. 8, 13, 14, 18, and 20.

Figure 21:
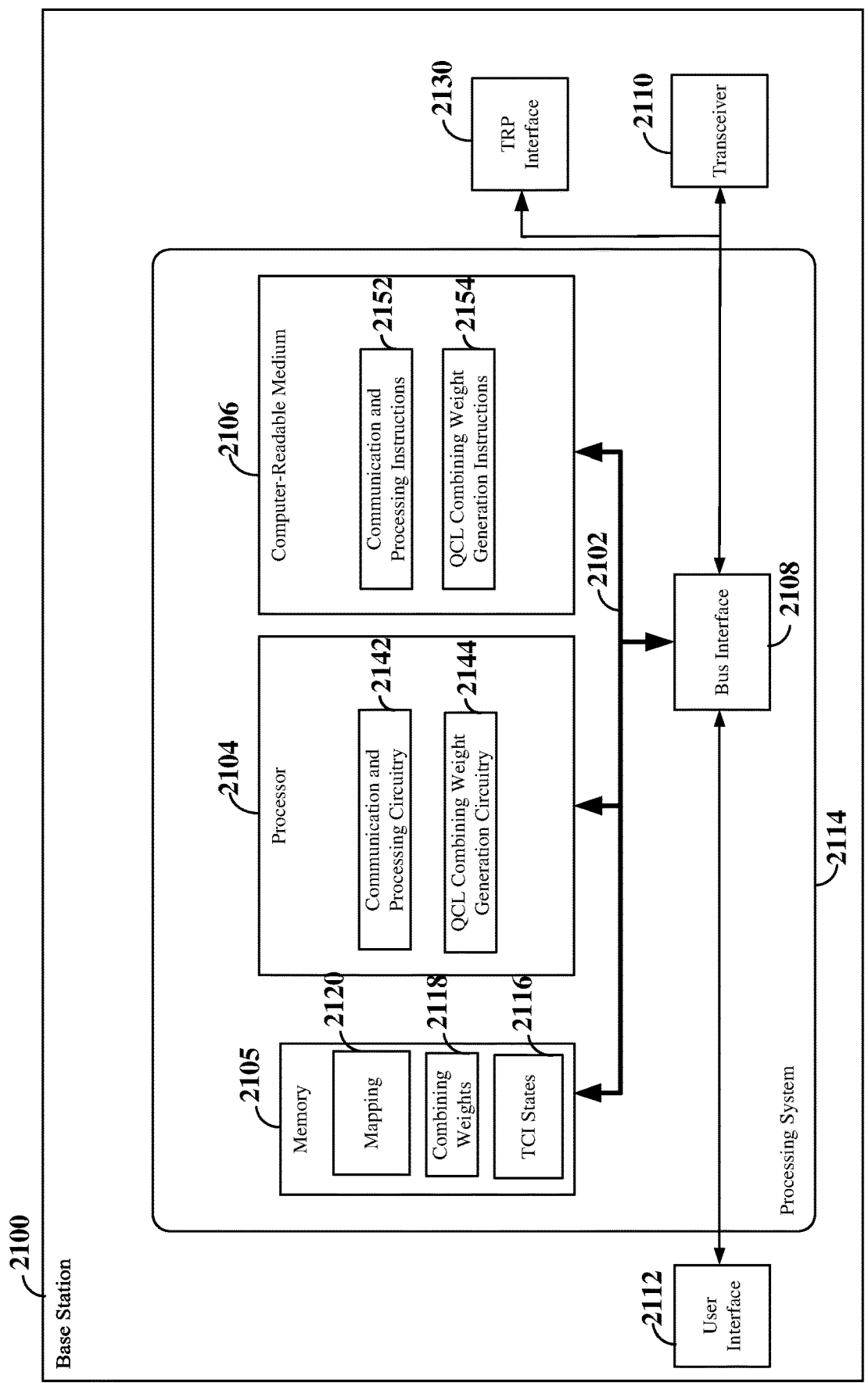
FIG. 21 is a block diagram illustrating an example of a hardware implementation of a network entity employing a processing system according to some aspects.

FIG. 21 is a block diagram illustrating an example of a hardware implementation of a network entity 2100 employing a processing system 2114 according to some aspects. The network entity 2100 may be, for example, any base station (e.g., gNB, eNB) or other scheduling entity as illustrated in any one or more of FIGS. 1, 2, 4-6, 8, 9, 11-14, and/or 18. The network entity 2100 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, the network entity 2100 may be a stationary network entity or a mobile network entity.

In accordance with various aspects of the disclosure, an element, or any portion of an element, or any combination of elements may be implemented with a processing system 2114 that includes one or more processors, such as processor 2104. The processing system 2114 may be substantially the same as the processing system 1914 as shown and described above in connection with FIG. 19, including a bus interface 2108, a bus 2102, a memory 2105, a processor 2104, and a computer-readable medium 2106. Furthermore, the network entity 2100 may include an optional user interface 2112 and a transceiver 2110, substantially similar to those described above in FIG. 19. Accordingly, their descriptions will not be repeated for the sake of brevity. In some examples, the bus interface 2108 may further provide an interface between the bus 2102 and a transmit receive point (TRP) interface 2130. The TRP interface 2130 may provide an interface (e.g., wireless or wired) between the network entity 2100 and a plurality of TRPs. In some examples, the TRP interface 2130 may be the transceiver 2110.

The processor 2104, as utilized in the network entity 2100, may be used to implement any one or more of the processes described below. In some examples, the memory 2105 may store one or more of TCI states 2116, combining weights 2118 (e.g., QCL combining weights), and a mapping 2120 between amplitude coefficients (e.g., wideband and sub-band Type II codebook amplitude coefficients) and the combining weights 2118. The TCI states 2116 may be transmitted to a UE via, for example, RRC signaling. In some examples, the TCI states may be enhanced TCI states.

In some aspects of the disclosure, the processor 2104 may include communication and processing circuitry 2142 configured for various functions, including, for example, providing an indication of a respective weight (QCL combining weight 2118) to be applied to each of a plurality of quasi co-location (QCL) parameters for each of a plurality of transmission configuration indicator (TCI) states 2116 associated with a single port. Each of the plurality of TCI states 2116 is associated with a respective transmission and reception point (TRP) of a plurality of TRPs. In some examples, the indication includes a first weight 2118 to be applied to a first TCI state 2116 of the plurality of TCI states 2116 and from which remaining weights 2118 to be applied to remaining TCI states 2116 of the plurality of TCI states 2116 are derived.

In some examples, the communication and processing circuitry 2142 may be configured to transmit downlink control information (DCI) including at least one codepoint mapped to at least one of the respective weights. In some examples, the communication and processing circuitry 2142 may be configured to transmit a medium access control (MAC) control element (MAC-CE) including a TCI codepoint activating the plurality of TCI states and further including the indication of the respective weights. In some examples, the communication and processing circuitry 2142 may be configured to transmit a medium access control (MAC) control element (MAC-CE) including the indication of the respective weights. In this example, the MAC-CE includes a respective indication for each of a plurality of TCI codepoints activated via a separate MAC-CE, each of the plurality of TCI codepoints being associated with a respective plurality of TCI states, each of the respective indications being associated a respective one of the plurality of TCI codepoints based on a respective ordinal position of each of the respective indications in the MAC-CE.

The communication and processing circuitry 2142 may further be configured to provide a coherent joint transmission (CJT) across the plurality of TRPs using the respective weights to the UE. In some examples, the CJT includes a plurality of layers associated with a plurality of ports. In this example, for each port of the plurality of ports, the communication and processing circuitry 2142 may be configured to transmit a respective indication of the respective weight to be applied to each of a respective plurality of QCL parameters for each of a respective plurality of TCI states. The communication and processing circuitry 2142 may further be configured to execute communication and processing software 2152 stored on the computer-readable medium 2106 to implement one or more functions described herein.

In some aspects of the disclosure, the processor 2104 may include other circuitry configured for various functions. For example, the processor 2104 may include QCL combining weight generation circuitry 2144, configured to generate the combining weights 2118 for a CJT. In some examples, the plurality of QCL parameter include Doppler shift, Doppler spread, average delay, and delay spread. In some examples, each respective weight is one of a plurality of configured values between zero and one. In some examples, each of the plurality of QCL parameters for a TCI state of the plurality of TCI states 2116 includes a different respective weight (combining weight 2118) or a common weight (combining weight 2118) that is common among the plurality of QCL parameters.

In some examples, the QCL combining weight generation circuitry 2144 may be configured to define the mapping 2120 between a plurality of amplitude coefficients of a Type II codebook and the plurality of weights 2118. For example, the mapping 2120 may be generated by the QCL combining weight generation circuitry 2144 or may be pre-configured in the memory 2105 of the network entity 2100 (e.g., by the OEM of the network entity). In some examples, the QCL combining weight generation circuitry 2144, together with the communication and processing circuitry 2142, may be configured to transmit the CJT using a first weight 2118 associated with the selected amplitude coefficients based on the mapping 2120, the first weight being applied to a first TCI state of the plurality of TCI states 2116 such that remaining weights 2118 to be applied to remaining TCI states of the plurality of TCI states 2116 may be derived from the first weight.

In some examples, the QCL combining weight generation circuitry 2144 may be configured to select other amplitude coefficients different than the selected amplitude coefficients and identify the respective weights associated with the other amplitude coefficients based on the mapping. In this example, the QCL combining weight generation circuitry 2144, together with the communication and processing circuitry 2142, may be configured to transmit the CJT using the respective weights.

In some examples, the QCL combining weight generation circuitry 2144 may be configured to configure a bit field associated with downlink control information (DCI) indicating whether the respective weights used for the CJT are based on the selected amplitude coefficients or other amplitude coefficients different than the selected coefficients. In some examples, the QCL combining weight generation circuitry 2144, together with the communication and processing circuitry 2142, may be configured to transmit the DCI excluding the bit field to indicate that the respective weights used for the CJT are associated with the selected amplitude coefficients based on the mapping. In other examples, the QCL combining weight generation circuitry 2144, together with the communication and processing circuitry 2142, may be configured to transmit the DCI including the bit field. In some examples, the bit field may have a value set to indicate that the respective weights used for the CJT are associated with the other amplitude coefficients based on the mapping. In this example, the DCI can further include an indication of the other amplitude coefficients. For example, the indication of the other amplitude coefficients may include a respective offset value for each of the selected amplitude coefficients. In some examples, the bit field may have a value set to indicate that the respective weights used for the CJT are associated with the selected amplitude coefficients (e.g., in the CSI report) based on the mapping. In this example, the CSI report may include a last received CSI report or a latest received CSI report prior to a processing gap associated with the CJT. The QCL combining weight generation circuitry 2144 may further be configured to execute QCL combining weight generation software 2154 stored on the computer-readable medium 2106 to implement one or more functions described herein.

Figure 22:
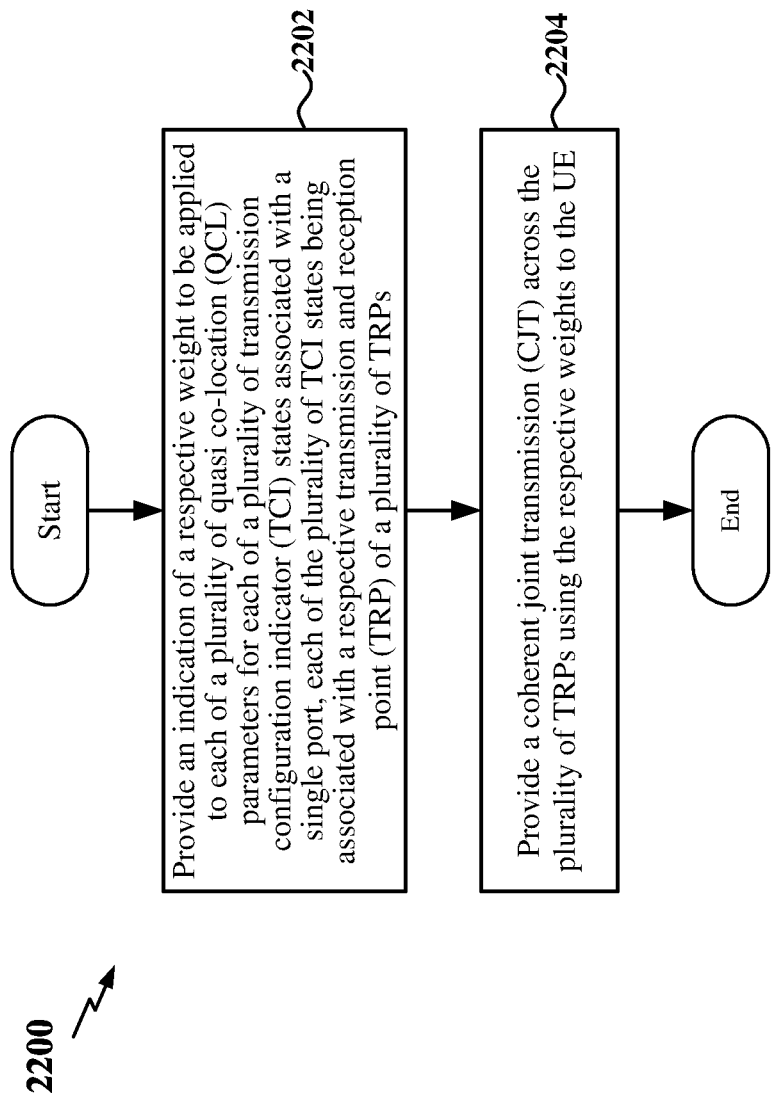
FIG. 22 is a flow chart illustrating an exemplary method of indicating QCL parameter weighting for CJTs according to some aspects.

FIG. 22 is a flow chart illustrating an exemplary method 2200 of indicating QCL parameter weighting for CJTs according to some aspects. In some examples, the method 2200 may be utilized in a SFN or CJT network. In some examples, the method 2200 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 2200 may be performed by the network entity 2100, as described herein and illustrated in FIG. 21, by a processor or processing system, or by any suitable means for carrying out the described functions.

At block 2202, the network entity may provide an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs. In some examples, the plurality of QCL parameters include Doppler shift, Doppler spread, average delay, and delay spread. In some examples, each respective weight includes one of a plurality of configured values between zero and one. In some examples, each of the plurality of QCL parameters for a TCI state of the plurality of TCI states includes a different respective weight or a common weight that is common among the plurality of QCL parameters. In some examples, for each port of a plurality of ports, the network entity may transmit a respective indication of the respective weight to be applied to each of a respective plurality of QCL parameters for each of a respective plurality of TCI states.

In some examples, the indication includes a first weight to be applied to a first TCI state of the plurality of TCI states and from which remaining weights to be applied to remaining TCI states of the plurality of TCI states are derived. In some examples, the network entity may transmit downlink control information (DCI) including at least one codepoint mapped to at least one of the respective weights. In some examples, the network entity may transmit a medium access control (MAC) control element (MAC-CE) including a TCI codepoint activating the plurality of TCI states and further including the indication of the respective weights. In some examples, the network entity may transmit a medium access control (MAC) control element (MAC-CE) including the indication of the respective weights. In some examples, the MAC-CE includes a respective indication for each of a plurality of TCI codepoints activated via a separate MAC-CE, each of the plurality of TCI codepoints being associated with a respective plurality of TCI states, each of the respective indications being associated a respective one of the plurality of TCI codepoints based on a respective ordinal position of each of the respective indications in the MAC-CE.

In some examples, the network entity may define a mapping between a plurality of amplitude coefficients of a Type II codebook and a plurality of weights. In addition, the network entity may receive a channel state information (CSI) report from the UE including a precoding matrix indicator (PMI) indicating selected amplitude coefficients of the plurality of amplitude coefficients. In some examples, the network entity may select other amplitude coefficients different than the selected amplitude coefficients and identify the respective weights associated with the other amplitude coefficients based on the mapping.

In some examples, the network entity may configure a bit field associated with downlink control information (DCI) indicating whether the respective weights used for the CJT are based on the selected amplitude coefficients or other amplitude coefficients different than the selected coefficients. In some examples, the network entity may transmit the DCI excluding the bit field to indicate that the respective weights used for the CJT are associated with the selected amplitude coefficients based on the mapping. In some examples, the network entity may transmit the DCI including the bit field, the bit field having a value set to indicate that the respective weights used for the CJT are associated with the other amplitude coefficients based on the mapping, the DCI further including an indication of the other amplitude coefficients. In some examples, the indication of the other amplitude coefficients includes a respective offset value for each of the selected amplitude coefficients. In some examples, the network entity may transmit the DCI including the bit field, the bit field having a value set to indicate that the respective weights used for the CJT are associated with the selected amplitude coefficients based on the mapping. In this example, the CSI report may be a last received CSI report or a latest received CSI report prior to a processing gap associated with the CJT.

In some examples, each of the QCL parameters of the plurality of TCI states includes a respective set of two or more QCL parameters and the indication comprises a respective indication of the respective weight to be applied to each of two or more QCL parameters for each of the QCL parameters of each of the plurality of TCI states. For example, the QCL combining weight generation circuitry 2144, together with the communication and processing circuitry 2142 and the transceiver 2110/TRP interface 2130, shown and described above in connection with FIG. 21, may provide a means for providing the indication of the respective weight to be applied to each of the plurality of QCL parameters for each of the plurality of TCI states.

At block 2204, the network entity may provide a coherent joint transmission (CJT) across the plurality of TRPs using the respective weights to the UE. In some examples, the network entity may transmit the CJT using a first weight associated with the selected amplitude coefficients based on the mapping, the first weight being applied to a first TCI state of the plurality of TCI states such that remaining weights to be applied to remaining TCI states of the plurality of TCI states are derived from the first weight. In some examples, the network entity may transmit the CJT using the respective weights associated with the other amplitude coefficients based on the mapping. For example, the QCL combining weight generation circuitry 2144, together with the communication and processing circuitry 2142 and transceiver 2110/TRP interface 2130, shown and described above in connection with FIG. 21, may provide a means for providing the CJT.

In one configuration, the network entity 2100 includes means for providing an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs and means for providing a coherent joint transmission (CJT) across the plurality of TRPs using the respective weights to the UE. In one aspect, the aforementioned means may be the processor 2104 shown in FIG. 21 configured to perform the functions recited by the aforementioned means. In another aspect, the aforementioned means may be a circuit or any apparatus configured to perform the functions recited by the aforementioned means.

Of course, in the above examples, the circuitry included in the processor 2104 is merely provided as an example, and other means for carrying out the described functions may be included within various aspects of the present disclosure, including but not limited to the instructions stored in the computer-readable storage medium 2106, or any other suitable apparatus or means described in any one of the FIGS. 1, 2, 4-6, 9, 11, and/or 12, and utilizing, for example, the processes and/or algorithms described herein in relation to FIGS. 8, 13, 14, 18, and 22.

The following provides an overview of aspects of the present disclosure:

Aspect 1: A method for wireless communication at a network entity, the method comprising: providing an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs; and providing a coherent joint transmission (CJT) across the plurality of TRPs using the respective weights to the UE.

Aspect 2: The method of aspect 1, wherein the plurality of QCL parameters comprise Doppler shift, Doppler spread, average delay, and delay spread.

Aspect 3: The method of aspect 1 or 2, wherein each respective weight comprises one of a plurality of configured values between zero and one.

Aspect 4: The method of any of aspects 1 through 3, wherein each of the plurality of QCL parameters for a TCI state of the plurality of TCI states comprises a different respective weight or a common weight that is common among the plurality of QCL parameters.

Aspect 5: The method of any of aspects 1 through 4, wherein the CJT comprises a plurality of layers associated with a plurality of ports, and further comprising: for each port of the plurality of ports, transmitting a respective indication of the respective weight to be applied to each of a respective plurality of QCL parameters for each of a respective plurality of TCI states.

Aspect 6: The method of any of aspects 1 through 5, wherein the indication comprises a first weight to be applied to a first TCI state of the plurality of TCI states and from which remaining weights to be applied to remaining TCI states of the plurality of TCI states are derived.

Aspect 7: The method of any of aspects 1 through 6, wherein the transmitting the indication further comprises: transmitting downlink control information (DCI) comprising at least one codepoint mapped to at least one of the respective weights.

Aspect 8: The method of any of aspects 1 through 6, wherein the transmitting the indication further comprises: transmitting a medium access control (MAC) control element (MAC-CE) comprising a TCI codepoint activating the plurality of TCI states and further comprising the indication of the respective weights.

Aspect 9: The method of any of aspects 1 through 6, wherein the transmitting the indication further comprises: transmitting a medium access control (MAC) control element (MAC-CE) comprising the indication of the respective weights.

Aspect 10: The method of aspect 9, wherein the MAC-CE comprises a respective indication for each of a plurality of TCI codepoints activated via a separate MAC-CE, each of the plurality of TCI codepoints being associated with a respective plurality of TCI states, each of the respective indications being associated a respective one of the plurality of TCI codepoints based on a respective ordinal position of each of the respective indications in the MAC-CE.

Aspect 11: The method of any of aspects 1 through 5, further comprising: defining a mapping between a plurality of amplitude coefficients of a type 2 codebook and a plurality of weights; and receiving a channel state information (CSI) report from the UE comprising a precoding matrix indicator (PMI) indicating selected amplitude coefficients of the plurality of amplitude coefficients.

Aspect 12: The method of aspect 11, wherein the transmitting the CJT further comprises: transmitting the CJT using a first weight associated with the selected amplitude coefficients based on the mapping, the first weight being applied to a first TCI state of the plurality of TCI states, wherein remaining weights to be applied to remaining TCI states of the plurality of TCI states are derived from the first weight.

Aspect 13: The method of aspect 11, wherein the transmitting the CJT further comprises: selecting other amplitude coefficients different than the selected amplitude coefficients; identifying the respective weights associated with the other amplitude coefficients based on the mapping; and transmitting the CJT using the respective weights.

Aspect 14: The method of aspect 11, wherein the transmitting the indication further comprises: configuring a bit field associated with downlink control information (DCI) indicating whether the respective weights used for the CJT are based on the selected amplitude coefficients or other amplitude coefficients different than the selected coefficients.

Aspect 15: The method of aspect 14, wherein the transmitting the indication further comprises: transmitting the DCI excluding the bit field to indicate that the respective weights used for the CJT are associated with the selected amplitude coefficients based on the mapping.

Aspect 16: The method of aspect 14, wherein the transmitting the indication further comprises: transmitting the DCI comprising the bit field, the bit field having a value set to indicate that the respective weights used for the CJT are associated with the other amplitude coefficients based on the mapping, the DCI further comprising an indication of the other amplitude coefficients.

Aspect 17: The method of aspect 16, wherein the indication of the other amplitude coefficients comprises a respective offset value for each of the selected amplitude coefficients.

Aspect 18: The method of aspect 14, wherein the transmitting the indication further comprises: transmitting the DCI comprising the bit field, the bit field having a value set to indicate that the respective weights used for the CJT are associated with the selected amplitude coefficients based on the mapping.

Aspect 19: The method of aspect 18, wherein the CSI report comprises a last received CSI report or a latest received CSI report prior to a processing gap associated with the CJT.

Aspect 20: The method of any of aspects 1 through 19, wherein each of the QCL parameters of the plurality of TCI states comprises a respective set of two or more QCL parameters and the indication comprises a respective indication of the respective weight to be applied to each of two or more QCL parameters for each of the QCL parameters of each of the plurality of TCI states.

Aspect 21: A network entity comprising a memory and a processor coupled to the memory, the processor configured to perform a method of any one of aspects 1 through 20.

Aspect 22: A network entity comprising means for performing a method of any one of aspects 1 through 20.

Aspect 23: A non-transitory computer-readable medium having stored therein instructions executable by one or more processors of a network entity to perform a method of any one of aspects 1 through 20.

Aspect 24: A method for wireless communication at a user equipment (UE), the method comprising: receiving, from a network entity, an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs associated with the network entity; receiving a coherent joint transmission (CJT) transmitted across the plurality of TRPs; and processing the CJT using composite QCL parameters generated based on the respective weights.

Aspect 25: The method of aspect 24, wherein the indication comprises a first weight to be applied to a first TCI state of the plurality of TCI states, and further comprising: deriving remaining weights to be applied to remaining TCI states of the plurality of TCI states from the first weight.

Aspect 26: The method of aspect 24 or 25, wherein the receiving the indication further comprises: receiving downlink control information (DCI) comprising at least one codepoint mapped to at least one of the respective weights.

Aspect 27: The method of aspect 24 or 25, wherein the receiving the indication further comprises: receiving a medium access control (MAC) control element (MAC-CE) comprising a TCI codepoint activating the plurality of TCI states and further comprising the indication of the respective weights.

Aspect 28: The method of aspect 24 or 25, wherein the receiving the indication further comprises: receiving a medium access control (MAC) control element (MAC-CE) comprising the indication of the respective weights.

Aspect 29: The method of aspect 24 or 25, further comprising: identifying a mapping between a plurality of amplitude coefficients of a Type II codebook and a plurality of weights; and transmitting a channel state information (CSI) report comprising a precoding matrix indicator (PMI) indicating selected amplitude coefficients of the plurality of amplitude coefficients.

Aspect 30: The method of aspect 29, wherein the receiving the CJT further comprises: receiving the CJT using a first weight associated with the selected amplitude coefficients based on the mapping, the first weight being applied to a first TCI state of the plurality of TCI states; and deriving remaining weights to be applied to remaining TCI states of the plurality of TCI states from the first weight.

Aspect 31: The method of aspect 29, wherein the receiving the CJT further comprises: receiving the CJT using the respective weights associated with other amplitude coefficients based on the mapping, the other amplitude coefficients being different than the selected amplitude coefficients; and receiving downlink control information (DCI) comprising a bit field indicating that the respective weights used for the CJT are associated with the other amplitude coefficients based on the mapping, the DCI further comprising an indication of the other amplitude coefficients.

Aspect 32: A user equipment (UE) comprising a transceiver, a memory, and a processor coupled to the transceiver and the memory, the processor configured to perform a method of any one of aspects 24 through 31.

Aspect 33: A UE comprising means for performing a method of any one of aspects 24 through 31.

Aspect 34: A non-transitory computer-readable medium having stored therein instructions executable by one or more processors of a UE to perform a method of any one of aspects 24 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 4-6, 8, 9, 11, 12, and/or 19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network entity, comprising:
    a memory; and
    a processor coupled to the memory, the processor being configured to:
        provide an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs; and
        provide a coherent joint transmission (CJT) across the plurality of TRPs using the respective weights to a user equipment (UE).

2. The network entity of claim 1, wherein the plurality of QCL parameters comprise Doppler shift, Doppler spread, average delay, and delay spread.

3. The network entity of claim 1, wherein each of the respective weights comprises one of a plurality of configured values between zero and one.

4. The network entity of claim 1, wherein each of the plurality of QCL parameters for a TCI state of the plurality of TCI states comprises a different respective weight or a common weight that is common among the plurality of QCL parameters.

5. The network entity of claim 1, wherein the CJT comprises a plurality of layers associated with a plurality of ports, and wherein the processor is further configured to:
    for each port of the plurality of ports, transmit a respective indication of the respective weight to be applied to each of a respective plurality of QCL parameters for each of a respective plurality of TCI states.

6. The network entity of claim 1, wherein the indication comprises a first weight to be applied to a first TCI state of the plurality of TCI states and from which remaining weights to be applied to remaining TCI states of the plurality of TCI states are derived.

7. The network entity of claim 1, wherein the processor is further configured to:
    transmit downlink control information (DCI) comprising at least one codepoint mapped to at least one of the respective weights.

8. The network entity of claim 1, wherein the processor is further configured to:
    transmit a medium access control (MAC) control element (MAC-CE) comprising a TCI codepoint activating the plurality of TCI states and further comprising the indication of the respective weights.

9. The network entity of claim 1, wherein the processor is further configured to:
    transmit a medium access control (MAC) control element (MAC-CE) comprising the indication of the respective weights.

10. The network entity of claim 9, wherein the MAC-CE comprises a respective indication for each of a plurality of TCI codepoints activated via a separate MAC-CE, each of the plurality of TCI codepoints being associated with a respective plurality of TCI states, each of the respective indications being associated a respective one of the plurality of TCI codepoints based on a respective ordinal position of each of the respective indications in the MAC-CE.

11. The network entity of claim 1, further comprising:
    a transceiver coupled to the processor and the memory, and wherein the processor is further configured to:
        define a mapping between a plurality of amplitude coefficients of a Type II codebook and a plurality of weights; and
        receive a channel state information (CSI) report from the UE comprising a precoding matrix indicator (PMI) indicating selected amplitude coefficients of the plurality of amplitude coefficients via the transceiver.

12. The network entity of claim 11, wherein the processor is further configured to:

transmit the CJT using a first weight associated with the selected amplitude coefficients based on the mapping, the first weight being applied to a first TCI state of the plurality of TCI states, wherein remaining weights to be applied to remaining TCI states of the plurality of TCI states are derived from the first weight.

13. The network entity of claim 11, wherein the processor is further configured to:
select other amplitude coefficients different than the selected amplitude coefficients;
identify the respective weights associated with the other amplitude coefficients based on the mapping; and
transmit the CJT using the respective weights.

14. The network entity of claim 11, wherein the processor is further configured to:
configure a bit field associated with downlink control information (DCI) indicating whether the respective weights used for the CJT are based on the selected amplitude coefficients or other amplitude coefficients different than the selected coefficients.

15. The network entity of claim 14, wherein the processor is further configured to:
transmit the DCI excluding the bit field to indicate that the respective weights used for the CJT are associated with the selected amplitude coefficients based on the mapping.

16. The network entity of claim 14, wherein the processor is further configured to:
transmit the DCI comprising the bit field, the bit field having a value set to indicate that the respective weights used for the CJT are associated with the other amplitude coefficients based on the mapping, the DCI further comprising an indication of the other amplitude coefficients.

17. The network entity of claim 16, wherein the indication of the other amplitude coefficients comprises a respective offset value for each of the selected amplitude coefficients.

18. The network entity of claim 14, wherein the processor is further configured to:
transmit the DCI comprising the bit field, the bit field having a value set to indicate that the respective weights used for the CJT are associated with the selected amplitude coefficients based on the mapping.

19. The network entity of claim 18, wherein the CSI report comprises a last received CSI report or a latest received CSI report prior to a processing gap associated with the CJT.

20. The network entity of claim 1, wherein each of the QCL parameters of the plurality of TCI states comprises a respective set of two or more QCL parameters and the indication comprises a respective indication of the respective weight to be applied to each of two or more QCL parameters for each of the QCL parameters of each of the plurality of TCI states.

21. A user equipment (UE), comprising:
a transceiver;
a memory; and
a processor coupled to the transceiver and the memory, the processor being configured to:
receive, from a network entity, an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs associated with the network entity;
receive a coherent joint transmission (CJT) transmitted across the plurality of TRPs; and
process the CJT using composite QCL parameters generated based on the respective weights.

22. The UE of claim 21, wherein the indication comprises a first weight to be applied to a first TCI state of the plurality of TCI states, and wherein the processor is further configured to:
derive remaining weights to be applied to remaining TCI states of the plurality of TCI states from the first weight.

23. The UE of claim 21, wherein the processor is further configured to:
receive downlink control information (DCI) comprising at least one codepoint mapped to at least one of the respective weights.

24. The UE of claim 21, wherein the processor is further configured to:
receive a medium access control (MAC) control element (MAC-CE) comprising a TCI codepoint activating the plurality of TCI states and further comprising the indication of the respective weights.

25. The UE of claim 21, wherein the processor is further configured to:
receive a medium access control (MAC) control element (MAC-CE) comprising the indication of the respective weights.

26. The UE of claim 21, wherein the processor is further configured to:
identify a mapping between a plurality of amplitude coefficients of a Type II codebook and a plurality of weights; and
transmitting a channel state information (CSI) report comprising a precoding matrix indicator (PMI) indicating selected amplitude coefficients of the plurality of amplitude coefficients.

27. The UE of claim 26, wherein the processor is further configured to:
receive the CJT using a first weight associated with the selected amplitude coefficients based on the mapping, the first weight being applied to a first TCI state of the plurality of TCI states; and
derive remaining weights to be applied to remaining TCI states of the plurality of TCI states from the first weight.

28. The UE of claim 26, wherein the processor is further configured to:
receive the CJT using the respective weights associated with other amplitude coefficients based on the mapping, the other amplitude coefficients being different than the selected amplitude coefficients; and
receive downlink control information (DCI) comprising a bit field indicating that the respective weights used for the CJT are associated with the other amplitude coefficients based on the mapping, the DCI further comprising an indication of the other amplitude coefficients.

29. A method for wireless communication at a network entity, the method comprising:
providing an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs; and providing a coherent joint transmission (CJT) across the plurality of TRPs using the respective weights to the UE.

30. A method for wireless communication at a user equipment (UE), the method comprising:
   receiving, from a network entity, an indication of a respective weight to be applied to each of a plurality of quasi co-location (QCL) parameters for each of a plurality of transmission configuration indicator (TCI) states associated with a single port, each of the plurality of TCI states being associated with a respective transmission and reception point (TRP) of a plurality of TRPs associated with the network entity;
   receiving a coherent joint transmission (CJT) transmitted across the plurality of TRPs; and
   processing the CJT using composite QCL parameters generated based on the respective weights.

* * * * *